United States Patent
Kamoda et al.

(10) Patent No.: US 10,429,941 B2
(45) Date of Patent: Oct. 1, 2019

(54) CONTROL DEVICE OF HEAD MOUNTED DISPLAY, OPERATION METHOD AND OPERATION PROGRAM THEREOF, AND IMAGE DISPLAY SYSTEM

(71) Applicant: FUJIFILM Corporation, Tokyo (JP)

(72) Inventors: Rena Kamoda, Tokyo (JP); Yuki Okabe, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/928,729

(22) Filed: Mar. 22, 2018

(65) Prior Publication Data

US 2018/0292908 A1 Oct. 11, 2018

(30) Foreign Application Priority Data

Apr. 11, 2017 (JP) ................. 2017-078064

(51) Int. Cl.
| | | |
|---|---|---|
| G06F 3/01 | (2006.01) | |
| G06T 19/00 | (2011.01) | |
| G06T 19/20 | (2011.01) | |
| G02B 27/01 | (2006.01) | |
| G06F 3/0481 | (2013.01) | |

(Continued)

(52) U.S. Cl.
CPC ........... *G06F 3/017* (2013.01); *G02B 27/017* (2013.01); *G02B 27/0172* (2013.01); *G06F 3/011* (2013.01); *G06F 3/04815* (2013.01); *G06F 3/04842* (2013.01); *G06T 19/006* (2013.01); *G06T 19/20* (2013.01); *G02B 2027/014* (2013.01); *G02B 2027/0141* (2013.01); *G02B 2027/0187* (2013.01); *G06F 3/0482* (2013.01); *G06F 3/0486* (2013.01); *G06F 3/04845* (2013.01); *G06K 9/00355* (2013.01); *G06T 2219/2016* (2013.01)

(58) Field of Classification Search
CPC ... G06F 3/017; G06F 3/04815; G06F 3/04845
USPC ............................................ 345/7–8; 715/863
See application file for complete search history.

(56) References Cited

U.S. PATENT DOCUMENTS

| | | | |
|---|---|---|---|
| 2012/0113223 A1 | 5/2012 | Hilliges et al. | |
| 2014/0123077 A1 | 5/2014 | Kutliroff et al. | |

(Continued)

FOREIGN PATENT DOCUMENTS

| | | | |
|---|---|---|---|
| JP | 2005-322071 A | 11/2005 | |
| JP | 2014-071812 A | 4/2014 | |

OTHER PUBLICATIONS

The extended European search report issued by the European Patent Office dated Aug. 17, 2018, which corresponds to European Patent Application No. 18162363.8-1216 and is related to U.S. Appl. No. 15/928,729.

*Primary Examiner* — Michael Pervan
(74) *Attorney, Agent, or Firm* — Studebaker & Brackett PC

(57) ABSTRACT

A selection processing unit performs selection processing of selecting one of a plurality of options relating to a 3D image, in a case where a double tap operation is recognized by an operation recognition unit, and of cyclically switching the option to be selected every time the double tap operation is recognized. A change processing unit performs change processing of changing a display form of a 3D image, which accompanies the one option selected in the selection processing unit in a case where a tap-and-hold operation is recognized by an operation recognition unit.

19 Claims, 28 Drawing Sheets

(51) Int. Cl.
*G06F 3/0484* (2013.01)
*G06F 3/0486* (2013.01)
*G06K 9/00* (2006.01)
*G06F 3/0482* (2013.01)

(56) References Cited

U.S. PATENT DOCUMENTS

2014/0132512 A1* 5/2014 Gomez Sainz-Garcia ................ G06F 3/014 345/158
2014/0267024 A1* 9/2014 Keller ..................... G06F 3/017 345/156
2015/0143283 A1   5/2015 Noda et al.

* cited by examiner

FIG. 16

| PHASE | GESTURE OPERATION | VIEWPOINT ALIGNMENT | OPERATION COMMAND |
|---|---|---|---|
| 3D IMAGE SELECTION | SINGLE TAP OPERATION | PROVISION | IMAGE SELECTION COMMAND |
| INITIAL DISPLAY POSITION SETTING | SINGLE TAP OPERATION | PROVISION | DISPLAY POSITION SETTING COMMAND |
| ADJUST MODE | DOUBLE TAP OPERATION | NONE | SELECTION COMMAND (SELECTION OF DISPLAY POSITION, DISPLAY SIZE, AND DISPLAY ORIENTATION) |
| ADJUST MODE (DISPLAY POSITION) | TAP-AND-HOLD OPERATION (RIGHT SLIDE OPERATION) | NONE | CHANGE COMMAND (MOVING TO RIGHT FROM DISPLAY POSITION) |
|  | TAP-AND-HOLD OPERATION (LEFT SLIDE OPERATION) | NONE | CHANGE COMMAND (MOVING TO LEFT FROM DISPLAY POSITION) |
| ... | ... | ... | ... |
| ADJUST MODE (DISPLAY SIZE) | TAP-AND-HOLD OPERATION (RIGHT SLIDE OPERATION) | NONE | CHANGE COMMAND (ENLARGEMENT OF DISPLAY SIZE) |
|  | TAP-AND-HOLD OPERATION (LEFT SLIDE OPERATION) | NONE | CHANGE COMMAND (REDUCTION OF DISPLAY SIZE) |

FIG. 17

| PHASE | GESTURE OPERATION | VIEWPOINT ALIGNMENT | OPERATION COMMAND |
|---|---|---|---|
| ADJUST MODE (DISPLAY ORIENTATION) | TAP-AND-HOLD OPERATION (RIGHT SLIDE OPERATION) | NONE | CHANGE COMMAND (ROTATION CLOCKWISE AROUND VERTICAL AXIS) |
| | TAP-AND-HOLD OPERATION (LEFT SLIDE OPERATION) | NONE | CHANGE COMMAND (ROTATION COUNTERCLOCKWISE AROUND VERTICAL AXIS) |
| | TAP-AND-HOLD OPERATION (UPWARD SLIDE OPERATION) | NONE | CHANGE COMMAND (ROTATION CLOCKWISE AROUND HORIZONTAL AXIS) |
| | TAP-AND-HOLD OPERATION (DOWNWARD SLIDE OPERATION) | NONE | CHANGE COMMAND (ROTATION COUNTERCLOCKWISE AROUND HORIZONTAL AXIS) |
| ADJUST MODE | SINGLE TAP OPERATION | NONE | MODE SWITCHING COMMAND |
| OBSERVE MODE | DOUBLE TAP OPERATION | NONE | SELECTION COMMAND (SELECTION OF STRUCTURE) |
| | TAP-AND-HOLD OPERATION (RIGHT SLIDE OPERATION) | NONE | CHANGE COMMAND (INCREASE OF TRANSMITTANCE) |
| | TAP-AND-HOLD OPERATION (LEFT SLIDE OPERATION) | NONE | CHANGE COMMAND (DECREASE OF TRANSMITTANCE) |
| ALL PHASES | SINGLE TAP OPERATION | PROVISION | END COMMAND |

FIG. 20
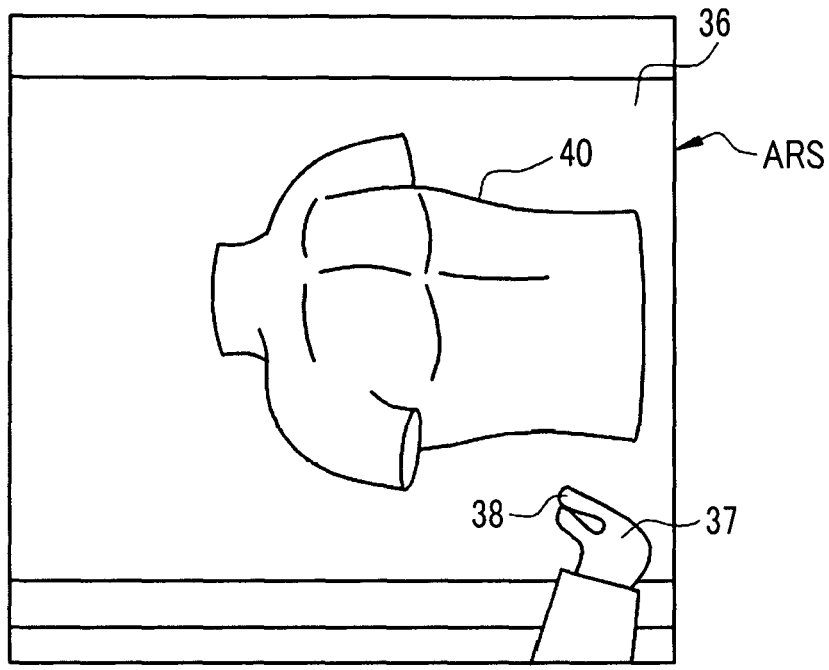
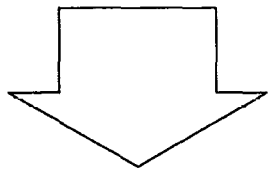
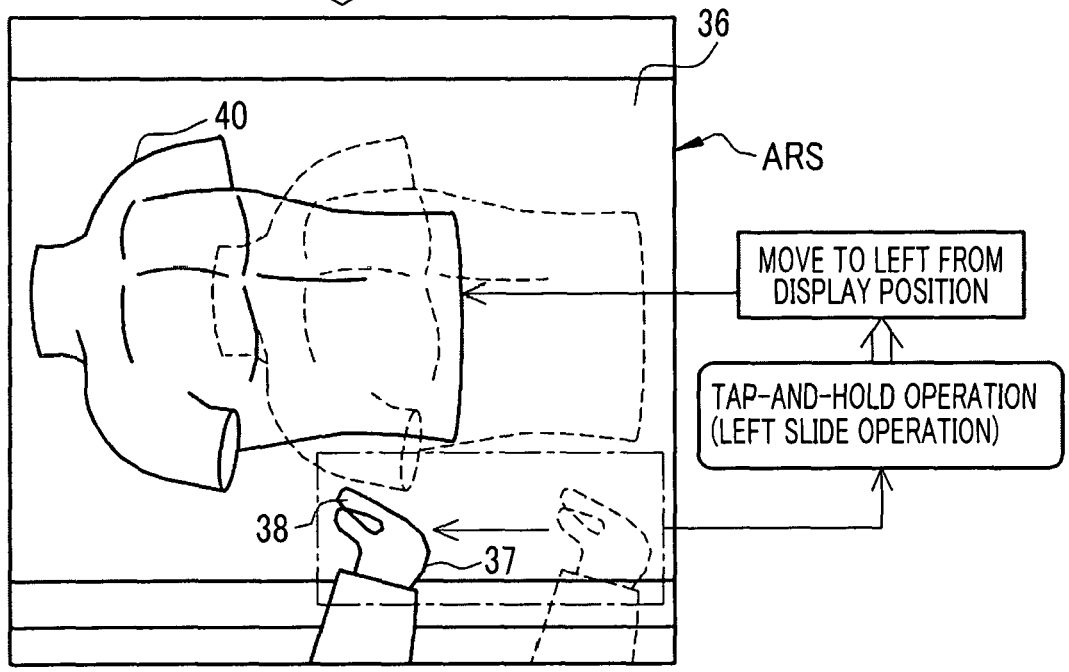

FIG. 21
<ADJUST MODE (DISPLAY SIZE)>
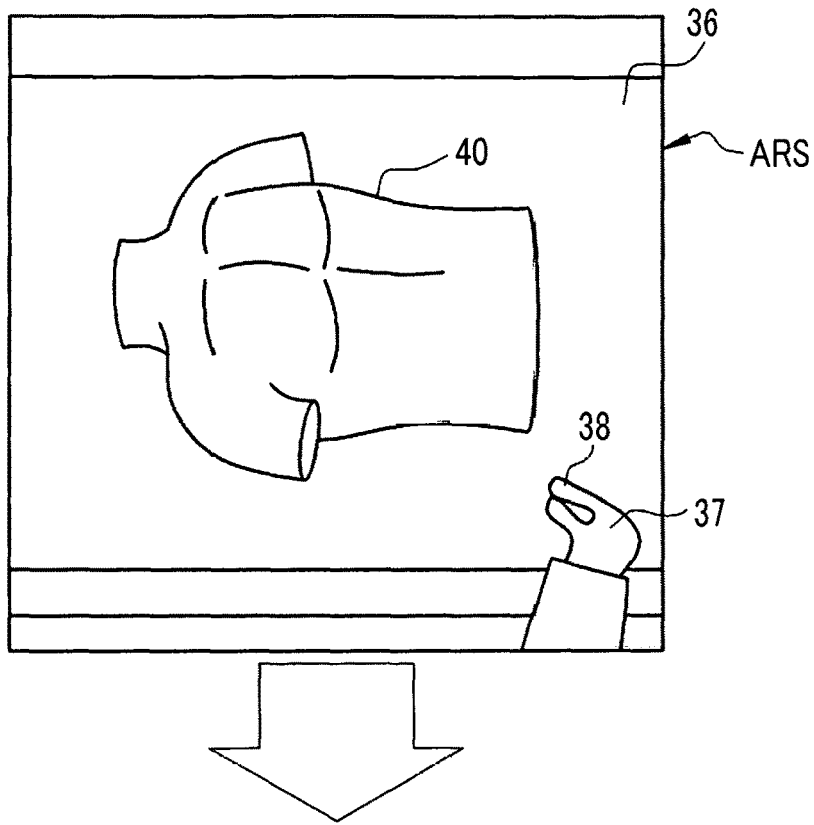
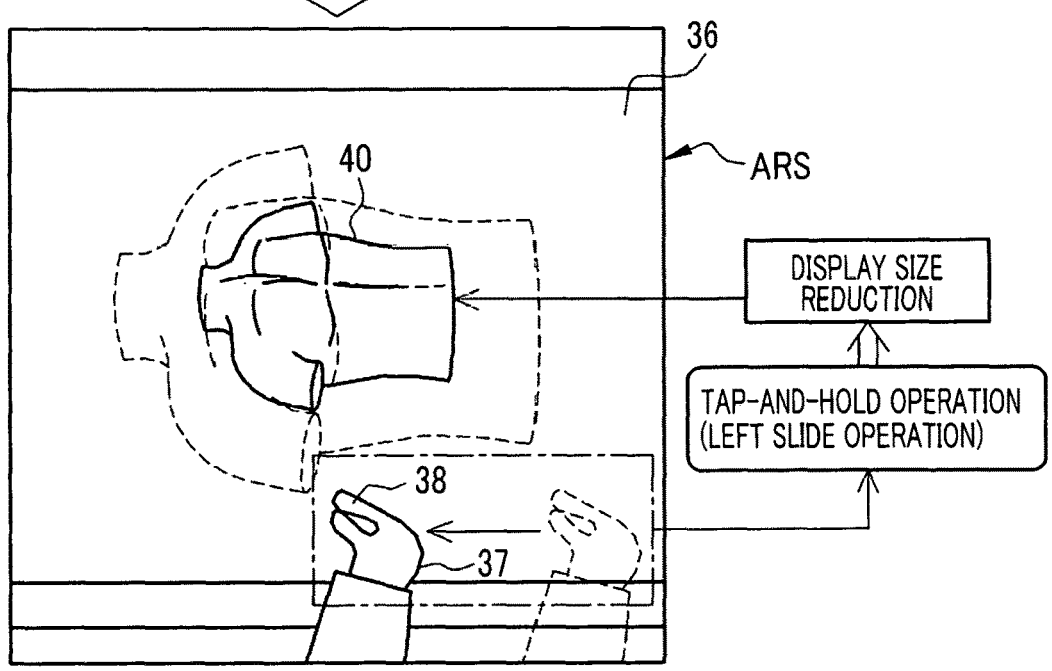

FIG. 22
<ADJUST MODE (DISPLAY ORIENTATION)>
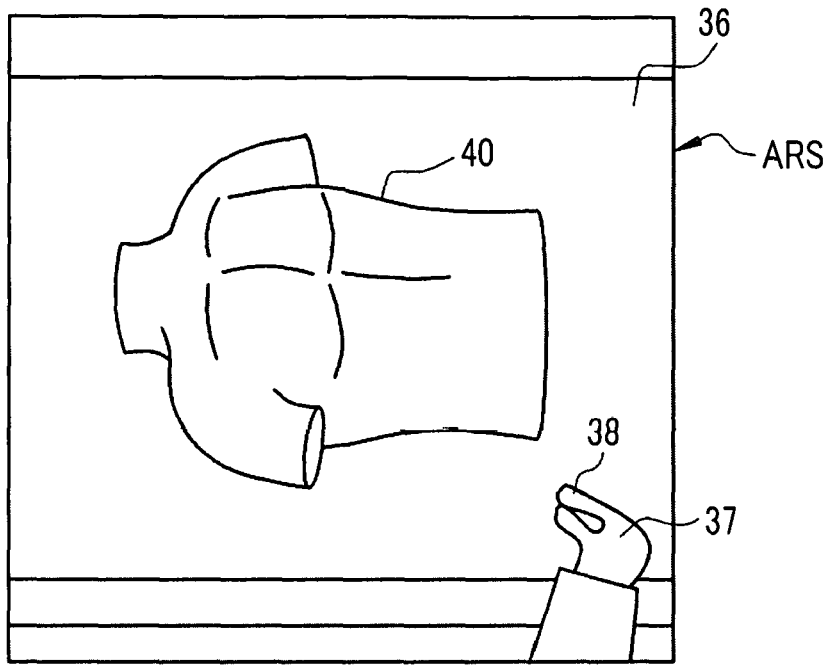
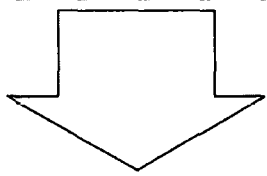
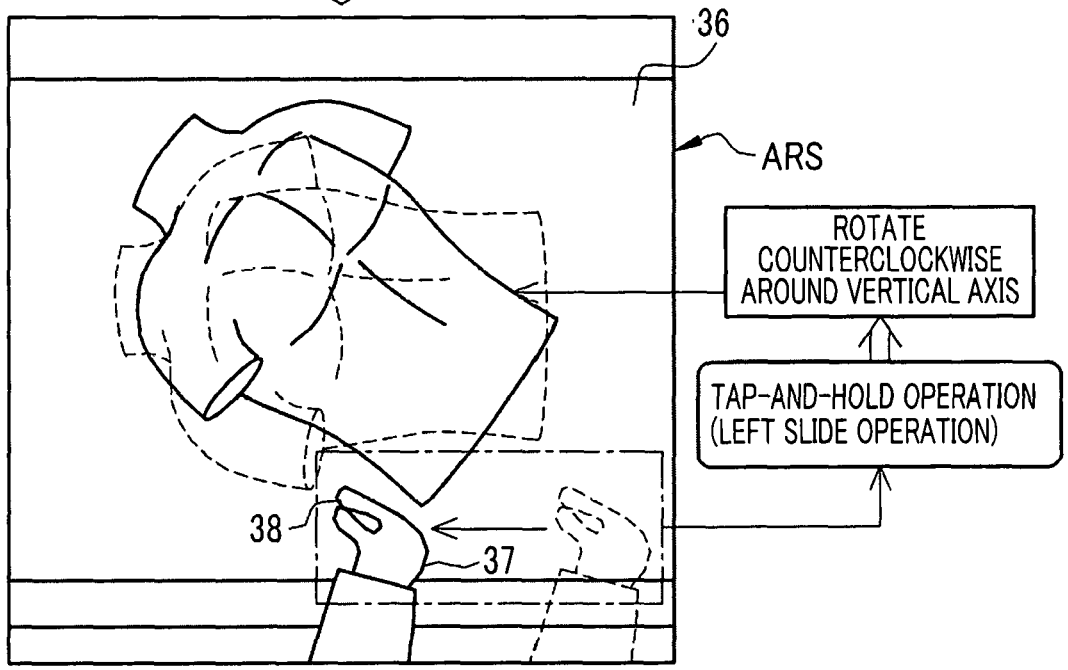

FIG. 23
<OBSERVE MODE>
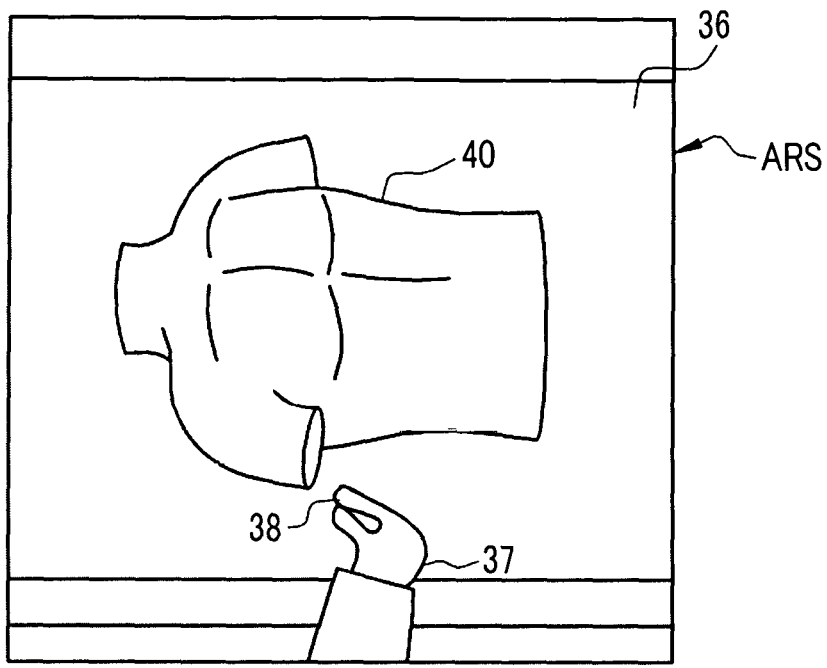
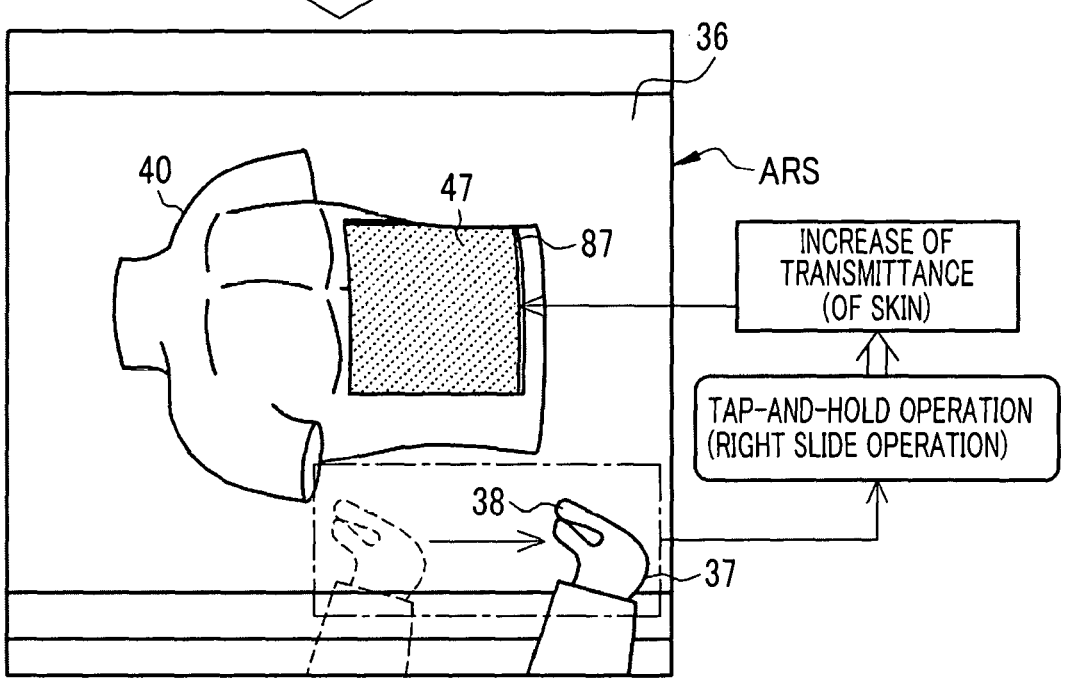

FIG. 28
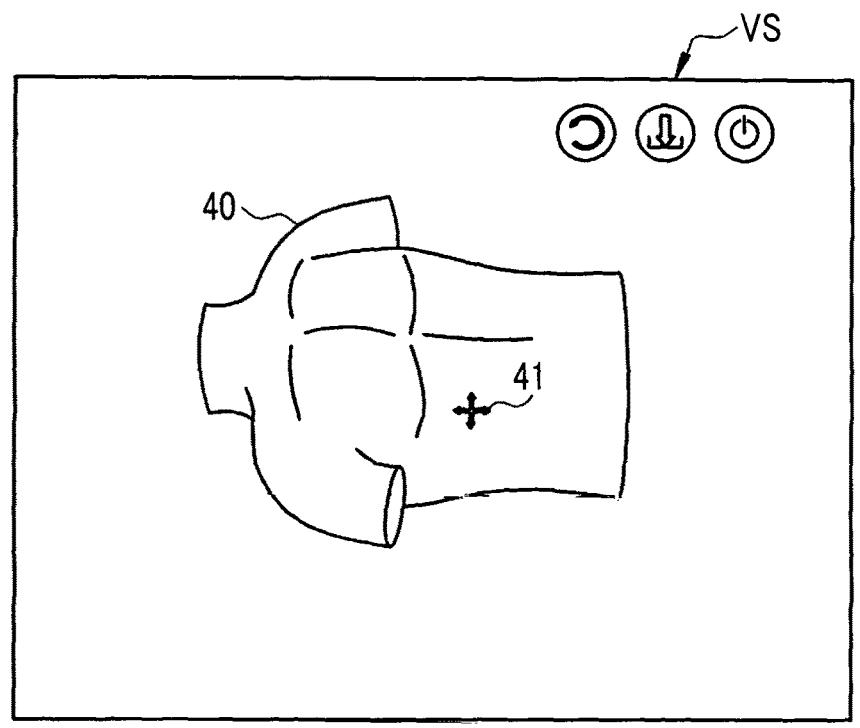
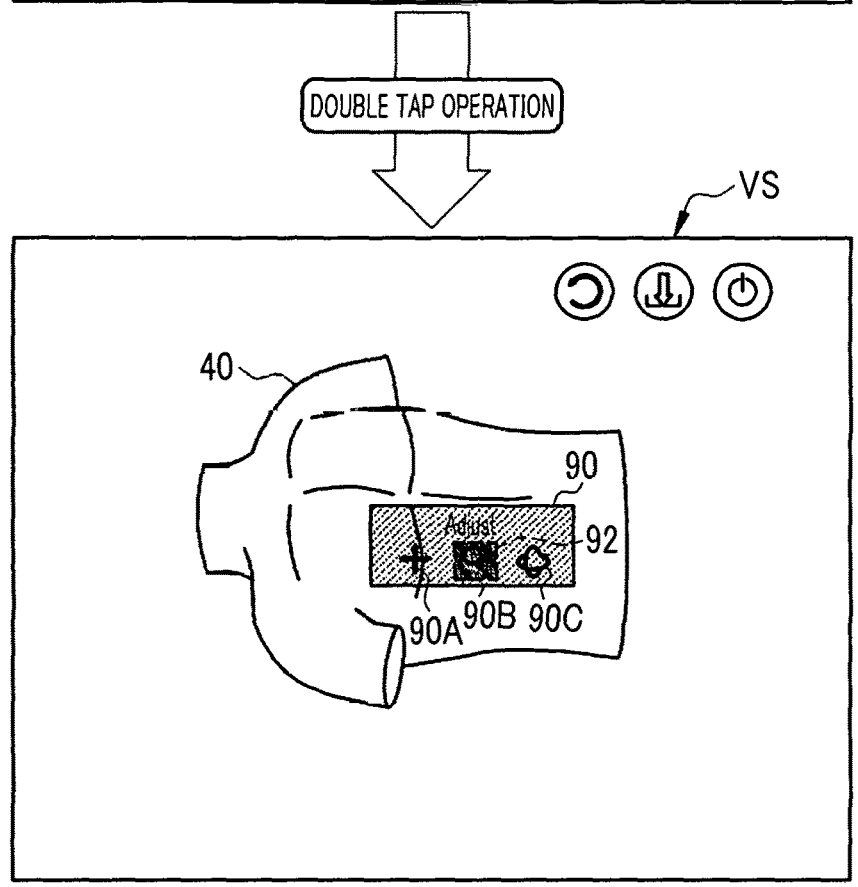

CONTROL DEVICE OF HEAD MOUNTED DISPLAY, OPERATION METHOD AND OPERATION PROGRAM THEREOF, AND IMAGE DISPLAY SYSTEM

CROSS-REFERENCE TO RELATED APPLICATIONS

The present application claims priority under 35 U.S.C. § 119 to Japanese Patent Application No. 2017-078064, filed on Apr. 11, 2017. Each of the above application(s) is hereby expressly incorporated by reference, in its entirety, into the present application.

BACKGROUND OF THE INVENTION

1. Field of the Invention

The present invention relates to a control device of a head mounted display, an operation method and a non-transitory computer readable recording medium storing an operation program of the head mounted display, and an image display system.

2. Description of the Related Art

A technology of displaying a virtual object using computer graphics in a head mounted display (hereinafter, HMD) mounted on the head of a user, and allowing the user to recognize the virtual object in the same manner as a real object existing in a real space is known.

JP2014-071812A discloses a control device of an HMD that recognizes various gesture operations which are performed on a virtual object by using the hand of a user. The control device performs change processing of changing a display form of a virtual object, such as a display position or a display size of a virtual object in accordance with the recognized gesture operation. A slide operation of moving the fingertip of the forefinger in a horizontal direction or a tap-and-hold operation of moving the hand in a state where the fingertips of the forefinger and the thumb are brought into contact with each other (state where a virtual object is grasped with the fingertips of the forefinger and the thumb) are exemplified as the gesture operation.

As disclosed in JP2014-071812A, in the technology using the HMD, the gesture operation is often adopted as an operation input method. In order to perform change processing of changing the display form of a virtual object by such a gesture operation, two kinds of operations as follows are required: a gesture operation (hereinafter, selection operation) for selecting one of a plurality of options for the type of the change processing, a target of the change processing, or the like; and a gesture operation (hereinafter, change operation) for practically performing change processing which accompanies the one option selected by the selection operation.

Although the technology in JP2005-322071A is not the technology using an HMD, a gesture operation is adopted as an operation input method for a three-dimensional stereoscopic image displayed in a display facing a user. In JP2005-322071A, an operation (hereinafter a click operation, described as a click action) of rapidly moving the hand back and forth is set as the selection operation. Every time the click operation is recognized, an option to be selected is cyclically switched. As the options, a plurality of three-dimensional stereoscopic images as a target of change processing, and a display position, a display size, and a display orientation of a three-dimensional stereoscopic image, which are types of change processing are exemplified.

In JP2005-322071A, a slide operation of moving the hand back and forth at a moving speed which is slower than a defined speed of the click operation, and a slide operation of moving the hand along a display surface of the display are set as the change operation. The user selects a desired three-dimensional stereoscopic image and the type of change processing by the click operations, and then performs the slide operation. Thus, change processing of the display position, the display size, or the display orientation of a three-dimensional stereoscopic image is performed.

SUMMARY OF THE INVENTION

Here, distinction between the selection operation and the change operation is required. That is, in a case where one of the selection operation and the change operation is erroneously recognized as the other, processing which is not intended by the user is performed (for example, change processing is performed although the selection operation is intended). Thus, usability is bad.

In JP2005-322071A, the change operation includes a slide operation which differs from the click operation as the selection operation only in the moving speed. Therefore, a situation in which the click operation is erroneously recognized as the slide operation and thus change processing of the display position, the display size, or the display orientation of a three-dimensional stereoscopic image is performed, or a situation in which, conversely, the slide operation is erroneously recognized as the click operation and thus the type of the target of change processing is switched easily occurs. Accordingly, usability may be bad.

An object of the present invention is to provide a control device of a head mounted display, an operation method and a non-transitory computer readable recording medium storing an operation program thereof, and an image display system in which erroneous recognition of a gesture operation can be effectively prevented and usability can be improved.

To solve the above problems, according to the present invention, a control device of a head mounted display controls an operation of the head mounted display which is mounted on a head of a user and allows the user to recognize a virtual space. The control device includes a display control unit that displays a three-dimensional virtual object in the virtual space, an operation recognition unit that recognizes a gesture operation performed on the virtual object with a hand of the user, a selection processing unit that selects one of a plurality of options relating to the virtual object in a case where a double tap operation in which an operation of lowering at least one finger other than a thumb toward the thumb and then raising the finger is consecutively performed twice, and that cyclically switches the option to be selected every time the double tap operation is recognized, and a change processing unit that performs change processing of changing a display form of the virtual object, which accompanies the one option selected in the selection processing unit in a case where a slide operation of moving the hand with any of a wrist, an elbow, or a shoulder as a fulcrum is recognized as the gesture operation.

It is preferable that the display control unit displays a menu bar in the virtual space, the menu bar in which the plurality of options is arranged in order, and the one option selected by the selection processing unit is focus-displayed in the menu bar. In this case, it is preferable that the display control unit displays the menu bar only in a case where the double tap operation is recognized as the gesture operation. It is preferable that the display control unit displays the menu bar at a viewpoint position of the user.

It is preferable that the options include a display position, a display size, or a display orientation of the virtual object, as a type of the change processing.

It is preferable that the virtual object has a plurality of structures and the options include the plurality of structures as a target of the change processing. In this case, it is preferable that the change processing unit performs transmittance change processing of changing transmittance of one structure selected by the selection processing unit among the plurality of structures, as the change processing.

It is preferable that the virtual object is a three-dimensional volume rendering image of a human body. It is preferable that the slide operation is a tap-and-hold operation of moving the hand in a state where fingertips of two fingers are brought into contact with each other.

According to the present invention, an operation method of a control device of a head mounted display that controls an operation of the head mounted display which is mounted on a head of a user and allows the user to recognize a virtual space includes a display control step of displaying a three-dimensional virtual object in the virtual space, an operation recognition step of recognizing a gesture operation performed on the virtual object with a hand of the user, a selection processing step of selecting one of a plurality of options relating to the virtual object in a case where a double tap operation in which an operation of lowering at least one finger other than a thumb toward the thumb and then raising the finger is consecutively performed twice, and of cyclically switches the option to be selected every time the double tap operation is recognized, and a change processing step of performing change processing of changing a display form of the virtual object, which accompanies the one option selected in the selection processing step in a case where a slide operation of moving the hand with any of a wrist, an elbow, or a shoulder as a fulcrum is recognized as the gesture operation.

According to the present invention, a non-transitory computer readable recording medium storing an operation program of a control device of a head mounted display is used for controlling an operation of the head mounted display which is mounted on a head of a user and allows the user to recognize a virtual space. The operation program causes a computer to perform: a display control function of displaying a three-dimensional virtual object in the virtual space, an operation recognition function of recognizing a gesture operation performed on the virtual object with a hand of the user, a selection processing function of selecting one of a plurality of options relating to the virtual object in a case where a double tap operation in which an operation of lowering at least one finger other than a thumb toward the thumb and then raising the finger is consecutively performed twice, and of cyclically switching the option to be selected every time the double tap operation is recognized, and a change processing function of performing change processing of changing a display form of the virtual object, which accompanies the one option selected by the selection processing function in a case where a slide operation of moving the hand with any of a wrist, an elbow, or a shoulder as a fulcrum is recognized as the gesture operation.

According to the present invention, an image display system includes a head mounted display mounted on a head of a user and a control device that controls an operation of the head mounted display and allows the user to recognize a virtual space through the head mounted display. The image display system includes a display control unit that displays a three-dimensional virtual object in the virtual space, an operation recognition unit that recognizes a gesture operation performed on the virtual object with a hand of the user, a selection processing unit that selects one of a plurality of options relating to the virtual object in a case where a double tap operation in which an operation of lowering at least one finger other than a thumb toward the thumb and then raising the finger is consecutively performed twice, and that cyclically switches the option to be selected every time the double tap operation is recognized, and a change processing unit that performs change processing of changing a display form of the virtual object, which accompanies the one option selected in the selection processing unit in a case where a slide operation of moving the hand with any of a wrist, an elbow, or a shoulder as a fulcrum is recognized as the gesture operation.

According to the present invention, a double tap operation in which an operation of lowering at least one finger other than the thumb toward the thumb and then raising the finger is consecutively performed twice is set as a selection operation which is a gesture operation of selecting one of a plurality of options relating to a virtual object, and a slide operation of moving the hand with any of a wrist, an elbow, or a shoulder as a fulcrum is set as a change operation which is a gesture operation for performing change processing of changing a display form of a virtual object. Thus, it is possible to provide a control device of a head mounted display, an operation method and a non-transitory computer readable recording medium storing an operation program thereof, and an image display system in which erroneous recognition of a gesture operation can be effectively prevented and usability can be improved.

BRIEF DESCRIPTION OF THE DRAWINGS

FIG. 16 is a diagram illustrating second correspondence information.

FIG. 17 is a diagram illustrating the second correspondence information.

FIG. 20 is a diagram illustrating change processing of moving a display position of a 3D image.

FIG. 21 is a diagram illustrating change processing of reducing a display size of the 3D image.

FIG. 22 is a diagram illustrating processing of changing a display orientation of the 3D image.

FIG. 23 is a diagram illustrating processing of changing transmittance of a structure selected from the 3D image.

FIG. 28 is a diagram illustrating a third embodiment in which the adjust-mode display bar is displayed at a viewpoint position of a user.

DESCRIPTION OF THE PREFERRED EMBODIMENTS

First Embodiment

Figure 1:
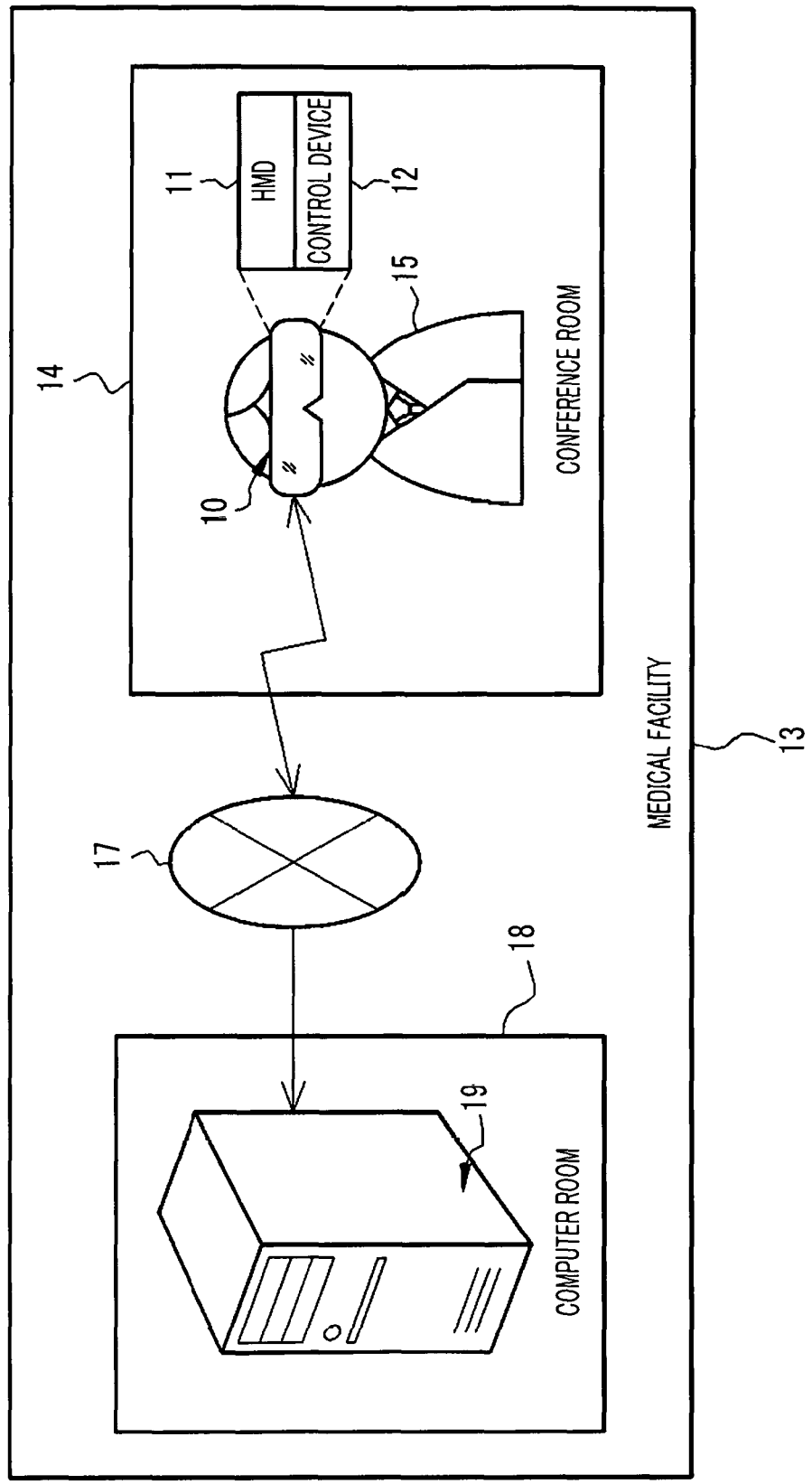
FIG. 1 is a diagram illustrating an image display system and an image storage server.

In FIG. 1, an image display system 10 is obtained by integrating an HMD 11 and a control device 12 and is used in a conference room 14 of a medical facility 13, for example. The image display system 10 is mounted on the head of a user 15. The user 15 is a medical staff such as a doctor or a nurse, who belongs to the medical facility 13. The head refers to a portion positioned upward from the neck of the human body in a standing state and includes a face and the like.

The image display system 10 is connected to an image storage server 19, for example, through a network 17 such as a local area network (LAN), so as to allow communication with each other. The image storage server 19 is installed in, for example, a computer room 18 of the medical facility 13.

The image storage server 19 stores various medical images of a patient, which have been acquired in the medical facility 13. The medical image includes a three-dimensional volume rendering image (hereinafter, 3D image) 40 (see FIG. 3) obtained in a manner that a computed tomography (CT) scan image 45 (see FIG. 5) is reconstructed by image processing. In the image storage server 19, a medical image can be searched for by using an image ID for identifying an individual medical image, a patient ID (identification data) for identifying a patient having a captured medical image, the type of modality in which the medical image has been captured, a photographing data, and the like as a search key.

The image storage server 19 searches for a medical image corresponding to a search key and transmits the searched medical image to the image display system 10, in accordance with a distribution request including a search key from the image display system 10. In FIG. 1, only one image display system 10 is connected to the image storage server 19. However, in practice, a plurality of image display systems 10 is provided in the medical facility 13, and the plurality of image display systems 10 is connected to the image storage server 19.

Figure 2:
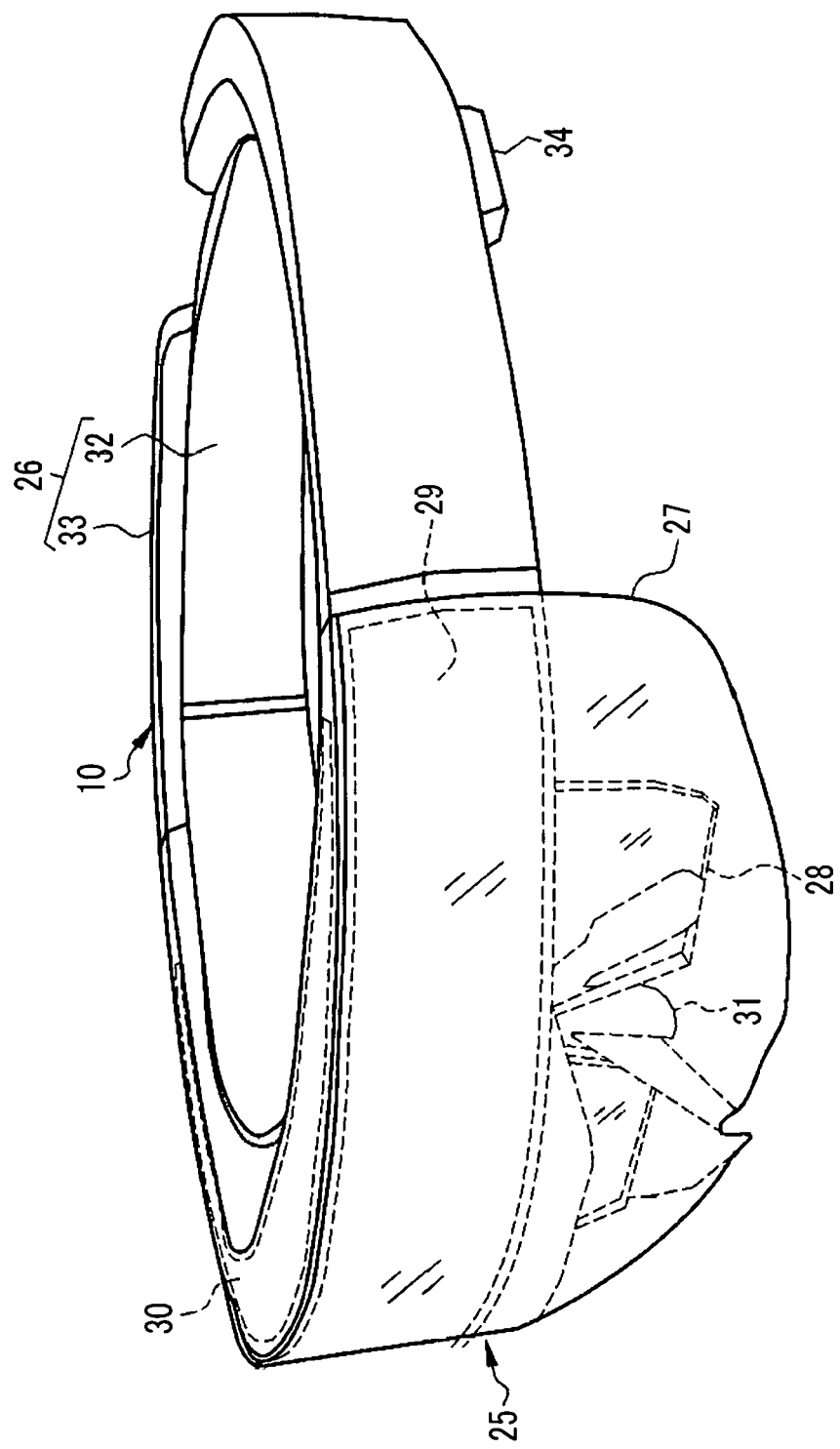
FIG. 2 is a perspective view illustrating an external appearance of the image display system.

In FIG. 2, the image display system 10 includes a main body portion 25 and a mounting portion 26. When the image display system 10 is mounted, the main body portion 25 is positioned in the front of the eyes of the user 15 and the mounting portion 26 is positioned at the upper half portion of the head of the user 15.

The main body portion 25 includes a protective frame 27, a screen 28, a sensor unit 29, and a control unit 30. The protective frame 27 is one transparent plate bending to cover the entirety of both eyes of the user 15. For example, the protective frame 27 is made of a transparent colored plastic. The screen 28 is disposed on the inner side of the protective frame 27. The screen 28 is assigned to each of both eyes of the user 15 and a nose pad 31 is provided at the center between screens. The screen 28 is made of a transparent material, similar to the protective frame 27. The user 15 recognizes the real space RS (see FIG. 4) through the screen 28 and the protective frame 27, with the unaided eyes. That is, the HMD 11 of the image display system 10 is a transmission type.

A virtual image using computer graphics is projected from a projection unit (not illustrated) and displayed on the inner surface of the screen 28, which faces the eyes of the user 15. As is well-known, the projection unit includes a display element of, for example, liquid crystal, which displays a virtual image and a projection optical system that projects the virtual image displayed in the display element toward the inner surface of the screen 28. In this case, the screen 28 is configured by a half mirror that reflects light for the virtual image and transmits light of the real space RS. The projection unit projects and displays virtual images on the inner surface of the screen 28 at a predetermined frame rate (for example, 60 frames/second). The light for the virtual image is reflected by the inner surface of the screen 28 and then is incident to the eyes of the user 15. Thus, the user 15 recognizes the virtual image as an imaginary image on a virtual space VS (see FIG. 4). The screen 28 may be used as the display element of liquid crystal, for example.

Figure 3:
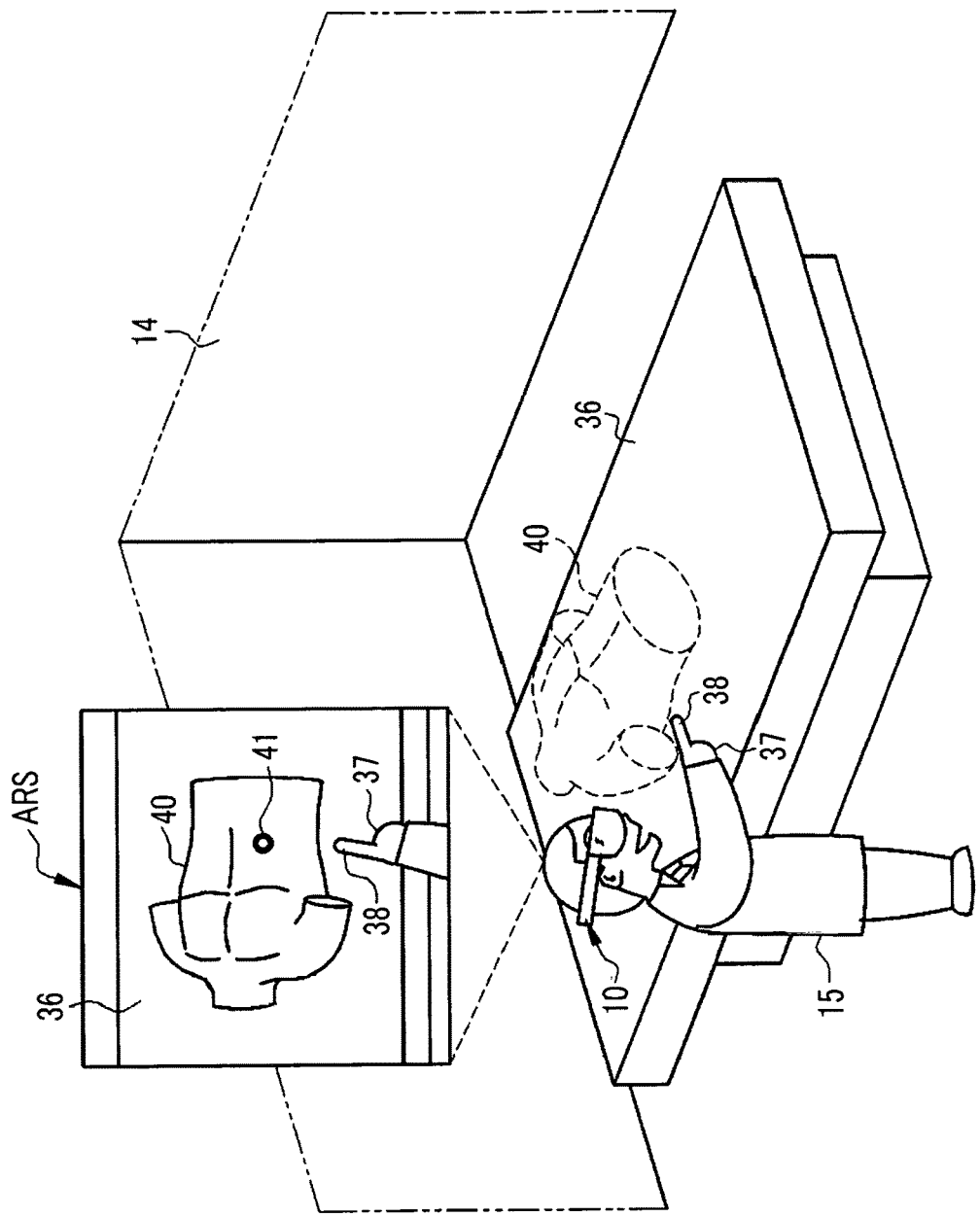
FIG. 3 is a diagram illustrating a form of examining a surgical policy of a target patient using the image display system.

In a virtual image, a virtual object recognized by the user 15 in the same manner as real objects existing in the real space RS is provided in an augmented reality space ARS (see FIG. 3). Here, the virtual object corresponds to a 3D image 40 (see FIG. 3) of the upper body of a patient. The user 15 performs a gesture operation on the 3D image 40 with the hand 37 (see FIG. 3).

The sensor unit 29 is positioned at the upper portion of the screen 28 and is covered by the protective frame 27, similar to the screen 28. The sensor unit 29 belongs to the HMD 11 and includes various sensors for understanding a usage state of the image display system 10. The sensors include a space recognition unit, a video camera including a color image pickup element, and an inertial measurement unit (IMU). The space recognition unit includes a plurality of infrared emitters and a plurality of space recognition cameras which are used for performing space recognition of the surrounding environment when the image display system 10 is used. The IMU is configured by an acceleration sensor, an angular velocity sensor (gyroscope), and a direction sensor (magnetometer). The IMU cooperates with the video camera to perform so-called head tracking of tracking the movement of the head of the user 15.

The sensor unit 29 also includes a gesture-operation recognition unit constituted by an infrared emitter and a depth sensor which are used for recognizing a gesture operation which is performed on the 3D image 40 with the hand 37 of the user 15. The depth sensor is a sensor that detects infrared light which has been emitted from the infrared emitter and then is reflected by real objects including the hand 37 and obtains information of the real space RS in a depth direction of the viewpoint of the user 15. The depth sensor captures images of the field of view which is substantially the same as the augmented reality space ARS recognized by the user 15 through the HMD 11, at a predetermined frame rate (for example, 60 frames/second). The user 15 performs a gesture operation in the field of view of the depth sensor.

The sensor unit 29 also includes a microphone for recording sound of the surrounding environment when the image display system 10 is used. A voice operation is possible by the microphone, in addition to the gesture operation. Although the transmission type HMD 11 is exemplified here, a non-transmission type HMD in which a virtual image is superimposed on a captured image of the real space RS, which has been captured by a video camera, and then this superimposition image is projected and displayed on the inner surface of the screen 28 may be used.

The control unit 30 is attached to the back side of a crescent-like top plate of the main body portion 25. Drivers of various sensors provided in the sensor unit 29, a power supply circuit (that supplies power from an internal battery to the units), a wireless communication circuit (that performs wireless communication with an external device such as the image storage server 19), a storage device 55, a memory 56, and a central processing unit (CPU) 57 (that totally controls the above components) (all in FIG. 7) are provided in the control unit 30. In the image display system 10 according to the embodiment, in which the HMD 11 and the control device 12 are integrated, the control unit 30 constitutes the control device 12.

The mounting portion 26 has a band shape having a width of about several centimeters. The mounting portion 26 is configured by an inner ring 32 and an outer ring 33. The inner ring 32 has an unbroken O-shape. The inner ring 32 is fixed in a state of being fitted to the upper half portion of the head of the user 15. An impact absorption pad made of urethane foam or the like is mounted on the inner surface of the inner ring 32, which is in contact with the head of the user 15. The size of the inner ring 32 can be adjusted depending on the size of the head of the user 15. The inner ring 32 can move back and forth with respect to the outer ring 33 in a predetermined movement range, and can rotate with respect to the outer ring 33 in a predetermined angle range. The inner ring 32 can rotate around an axis penetrating both ears of the user 15 as a rotation center.

The outer ring 33 has a C-shape, that is, a portion of the outer ring 33 on the back of the head is notched. The outer ring 33 deflects outwardly from an initial position toward the outside or shrinks inwardly from the deflected state toward the initial position, in accordance with size adjustment of the inner ring 32.

A speaker 34 that outputs sound is provided at a portion of the outer ring 33, which faces both ears of the user 15 (FIG. 2 illustrates only the left speaker 34). Although not illustrated, a volume adjustment button of the speaker 34 and a brightness adjustment button of backlight of the screen 28 are provided at the upper portion of the speaker 34. Further, although not illustrated, a power button and a universal serial bus (USB) terminal are provided at the notched portion of the outer ring 33 on the back of the head.

The image display system 10 operates by power of the internal battery through the power supply circuit, and performs wireless communication with the external device such as the image storage server 19 by the wireless communication circuit. Therefore, the image display system 10 can be used in a wireless manner. A USB cable is connected to the USB terminal of the outer ring 33 so as to perform connection to the external device in a wired manner, and thus power supply from the external device and wired communication with the external device can be performed.

FIG. 3 illustrates a form in which the user 15 in the conference room 14 of the medical facility 13 examines a surgical policy of a patient scheduled for surgery (hereinafter, target patient) by using the image display system 10. The user 15 recognizes the augmented reality space ARS through the HMD 11.

A table 36 is installed in the conference room 14. A 3D image 40 of the upper body of the target patient on the supine posture is displayed as a virtual object, in the middle of the table 36. The 3D image 40 is disposed in a manner that a display position in the real space RS is fixed at the substantially middle of the table 36, a body axis thereof is along the long side of the table 36, the neck is on the left side of the user 15, and the waist is on the right side of the user 15.

The user 15 stands at substantially the middle of one long side of the table 36. The user 15 points to the table 36 with the hand (right hand) 37 and the finger (forefinger) 38. The 3D image 40 is just a virtual object and thus the 3D image 40 does not exist on the table 36 in the real space RS. Therefore, the 3D image 40 on the table 36 in FIG. 3 is illustrated with a broken line.

Since the display position of the 3D image 40 in the real space RS is fixed at the substantially middle of the table 36, a manner in which the 3D image 40 appears in the augmented reality space ARS recognized by the user 15 varies depending on a standing position of the user 15. Specifically, the user 15 views the right half of the 3D image 40 on the front side and views the neck on the left side, at the standing position illustrated in FIG. 3. Conversely, in a case where the user 15 stands on the other long side of the table 36, which is opposite to the standing position illustrated in FIG. 3, the left half of the 3D image 40 is viewed on the front side and the neck thereof is viewed on the right side.

For example, if the user 15 is close to the table 36, the 3D image 40 is displayed to be expanded as becoming closer. Conversely, if the user 15 is far from the table 36, the 3D image 40 is displayed to be reduced as becoming farther.

As described above, display of the 3D image 40 is changed in accordance with a three-dimensional position relation between the image display system 10 (user 15) and the table 36. The three-dimensional position relation between the image display system 10 and the table 36 can be recognized in a manner that the space recognition unit in the sensor unit 29 performs space recognition of the entirety of the conference room 14 including the table 36 and head tracking is performed by the video camera and the IMU. In addition, a manner that the table 36 and the like as real objects in the real space RS appear in the augmented reality space ARS varies depending on the standing position of the user 15.

Figure 4:
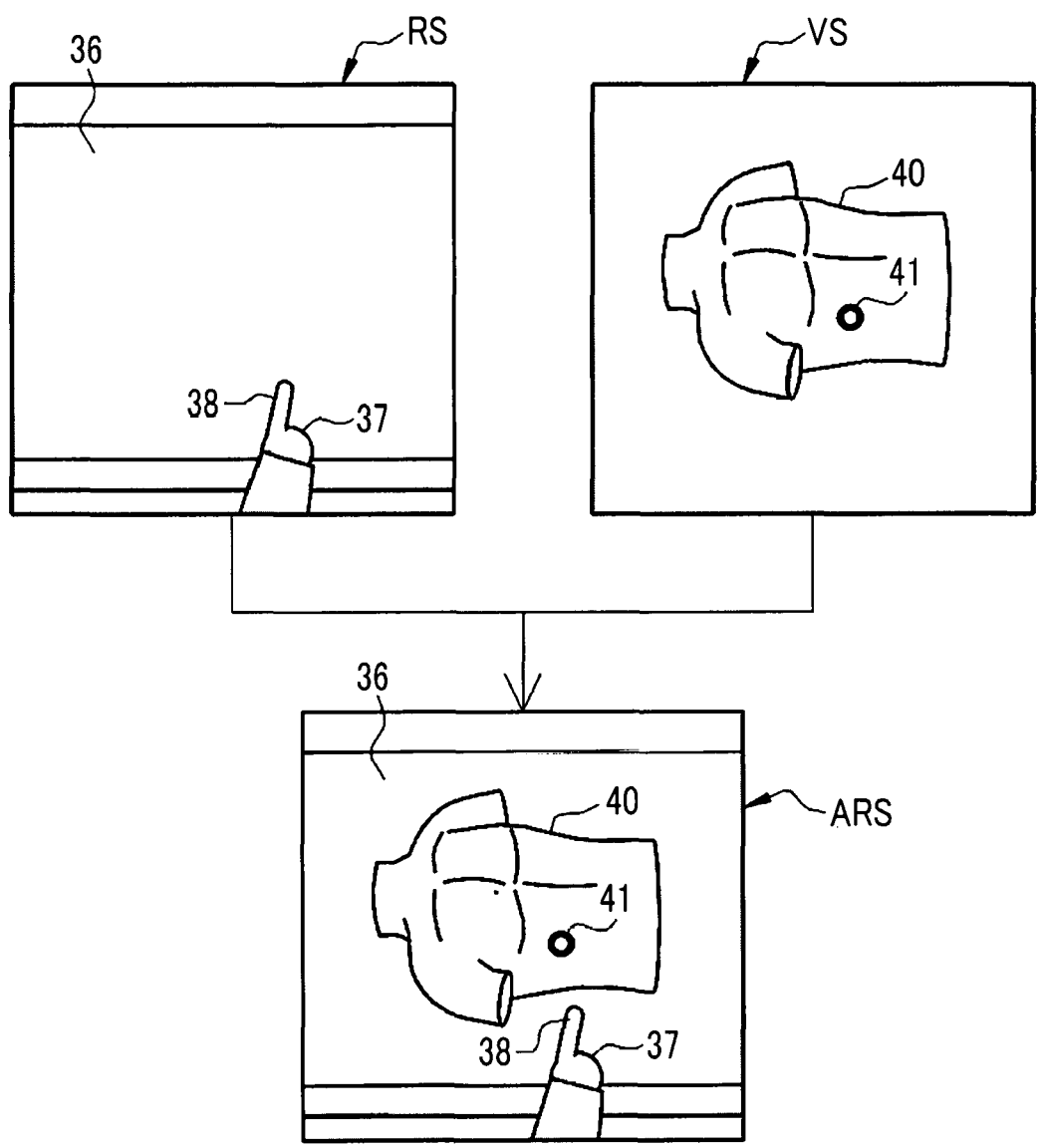
FIG. 4 is a diagram illustrating establishment of an augmented reality space.

FIG. 4 illustrates establishment of the augmented reality space ARS recognized by the user 15. The user 15 visually recognizes the real space RS in which the table 36 and the hand 37 exist, through the screen 28 and the protective frame 27. In addition, the user 15 visually recognizes the virtual space VS in which the 3D image 40 is provided, through the inner surface of the screen 28. Thus, the user 15 recognizes the augmented reality space ARS obtained by combining the real space RS and the virtual space VS.

A cursor 41 indicating the viewpoint position of the user 15 is disposed in the virtual space VS to be superimposed. The cursor 41 has a shape of a double circle. The display position of the cursor 41 is determined based on the result of head tracking performed by cooperation of the video camera and the IMU in the sensor unit 29. That is, the cursor 41 moves with the movement of the head of the user 15. For example, if the head of the user 15 is directed upward, the cursor 41 also moves upward.

Figure 5:
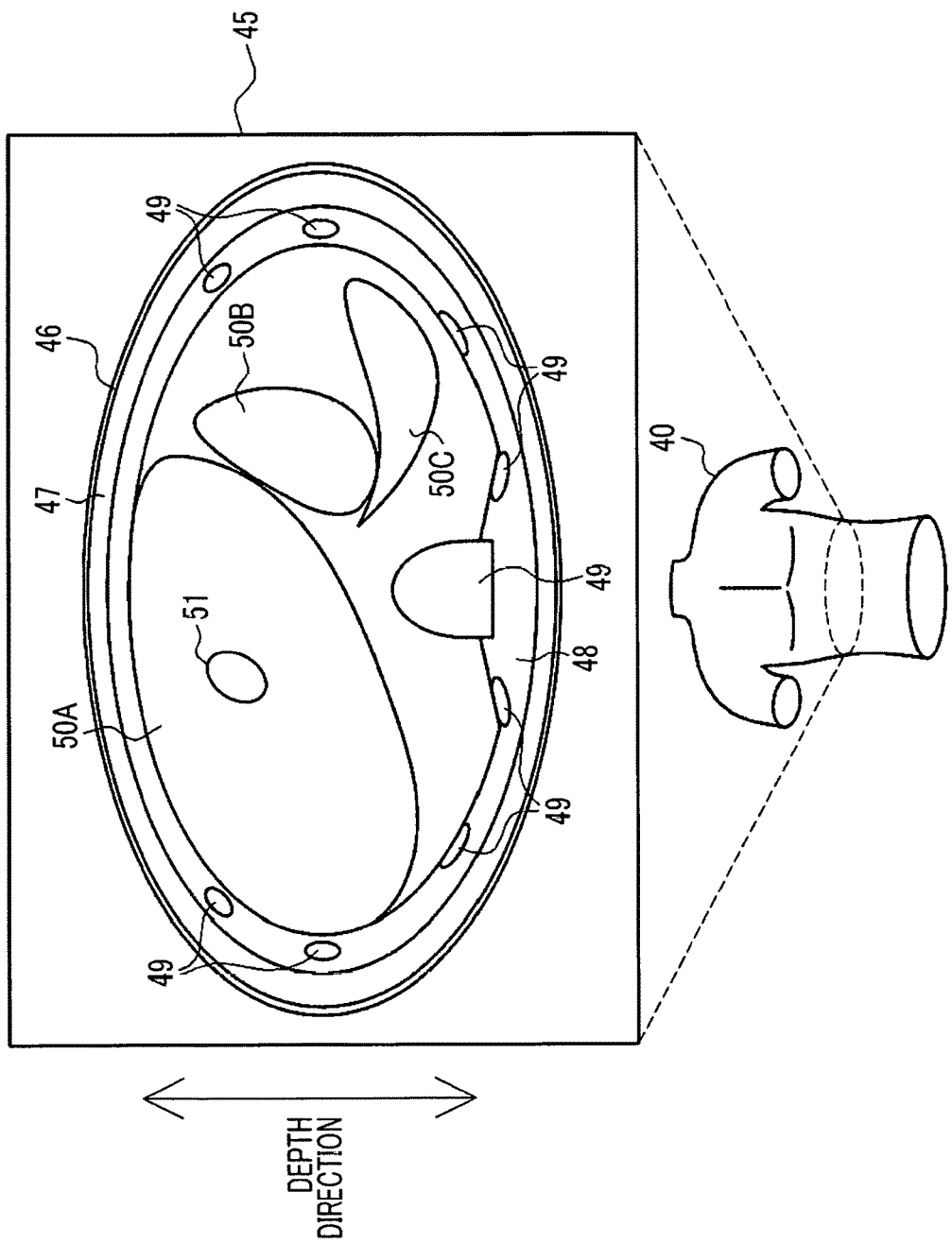
FIG. 5 is a diagram illustrating a CT scan image constituting a 3D image.

FIG. 5 illustrates one of a plurality of CT scan images 45 constituting the 3D image 40. Here, a back-and-forth direction of the human body, which is along a line connecting the abdomen and the back and is parallel to a plane (slice plane) of the CT scan image 45 is set as a depth direction. A plurality of structures of human tissue, such as skin 46, subcutaneous tissue 47 (for example, fat), muscular tissue 48 (for example, rectus abdominis muscle), bones 49 (for example, ribs and sternum), internal organs 50 (for example, liver 50A, stomach 50B, and spleen 50C), and lesion 51 (for example, tumor) is displayed in the CT scan image 45 in an order from the outer side thereof. The 3D image 40 is obtained by reconstructing CT scan images 45 in which the plurality of such structures of the human tissue are displayed. Therefore, the 3D image 40 is a virtual object in which a plurality of structures overlaps each other in the depth direction. In the 3D image 40, for example, the skin 46 is colored with the skin color, the bones 49 is colored gray, the internal organs 50 are colored pink, and the lesion 51 is colored red.

Among the plurality of structures, the skin 46, the subcutaneous tissue 47, the muscular tissue 48, and the bones 49 exist in this order from the outer side, regardless of the positions thereof on the 3D image 40. The internal organs 50 such as the liver 50A changes in the 3D image 40, in accordance with the position thereof in a body axis direction. Here, the liver 50A, the stomach 50B, and the spleen 50C are exemplified. However, since the 3D image 40 is a 3D image of the upper body, other internal organs 50 such as kidney, pancreas, small intestine, and large intestine are also included in the 3D image 40.

Figure 6:
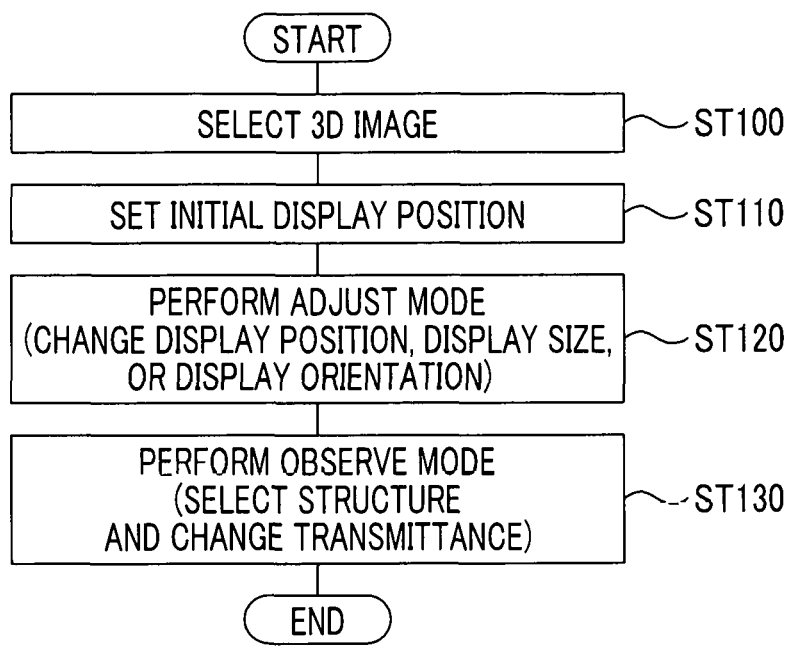
FIG. 6 is a flowchart illustrating a rough flow of examining the surgical policy of the target patient using the image display system.

FIG. 6 is a flowchart illustrating a rough flow when the user 15 examines a surgical policy of a target patient by using the image display system 10. Firstly, a list of file icons for the 3D image 40 is displayed in the HMD 11. A 3D image 40 of the target patient, which is to be displayed as a virtual object is selected from the list by the user 15 (Step ST100). After the 3D image 40 is selected, the image display system 10 sets an initial display position of the 3D image 40 (Step ST110). An approximate position, for example, on the table 36 is set as the initial display position.

After the initial display position is set, the image display system 10 performs an adjust mode (Step ST120). In the adjust mode, any of the display position, the display size, or the display orientation of the 3D image 40 can be selected and the selected attribute can be changed from the initial display position to be the preference of the user 15.

That is, in the adjust mode, the display position, the display size, and the display orientation of the 3D image 40 in the real space RS correspond to a plurality of options relating to the virtual object. In the adjust mode, change processing of each of the display position, the display size, and the display orientation of the 3D image 40 corresponds to change processing of changing a display form of the virtual object, which accompanies the selected one option.

In a case where the display position, the display size, or the display orientation of the 3D image 40 is changed to be the preference of the user 15 in the adjust mode, and then an instruction to end the adjust mode is received from the user 15, the image display system 10 performs an observe mode (Step ST130). In the observe mode, the 3D image 40 having the display position, the display size, and the display orientation which have been set in the adjust mode can be observed.

In the observe mode, a structure such as the skin 46 can be selected and transmittance of the selected structure can be changed. For example, a lesion 51 scheduled for surgery can be directly and visually recognized by selecting each of the structure such as the skin 46, the subcutaneous tissue 47, the muscular tissue 48, and the bones 49 and changing transmittance of all of the structures to be 100% (transparent).

That is, in the observe mode, the plurality of structures correspond to the plurality of options relating to the virtual object. In the observe mode, transmittance change processing of changing transmittance of the selected structure corresponds to change processing of changing a display form of the virtual object, which accompanies the selected one option. In the observe mode, a configuration in which virtual laparotomy can be performed on the 3D image 40 by using a virtual scalpel may be made.

Figure 7:
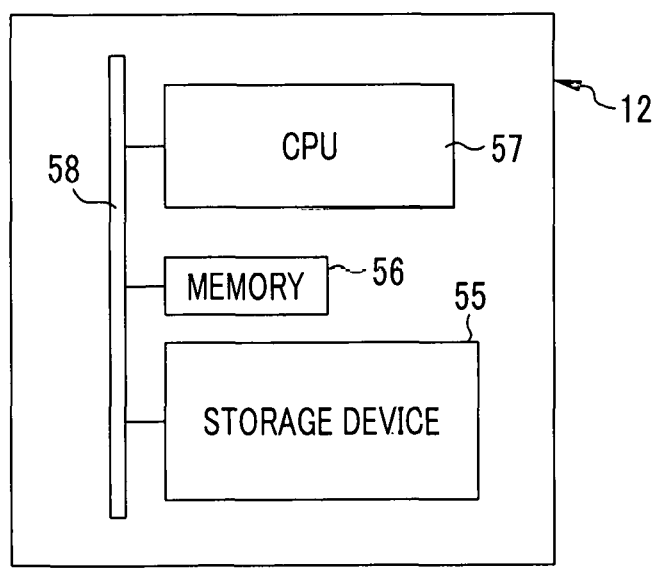
FIG. 7 is a block diagram illustrating a computer constituting a control device.

In FIG. 7, the control device 12 of the image display system 10 includes the storage device 55, the memory 56, the CPU 57, and the like which are described above. The components are connected to each other through a data bus 58. The control device 12 includes the driver of various sensors, the power supply circuit, and the wireless communication circuit in addition to the above components.

The storage device 55 is a hard disk drive mounted in the control device 12, for example. The storage device 55 stores a control program such as an operating system, various application program, and various types of data accompanying the above programs.

The memory 56 is a work memory for causing the CPU 57 to perform processing. The CPU 57 totally controls the units of the control device 12 by loading the program stored in the storage device 55 onto the memory 56 and performing processing in accordance with the loaded program.

Figure 8:
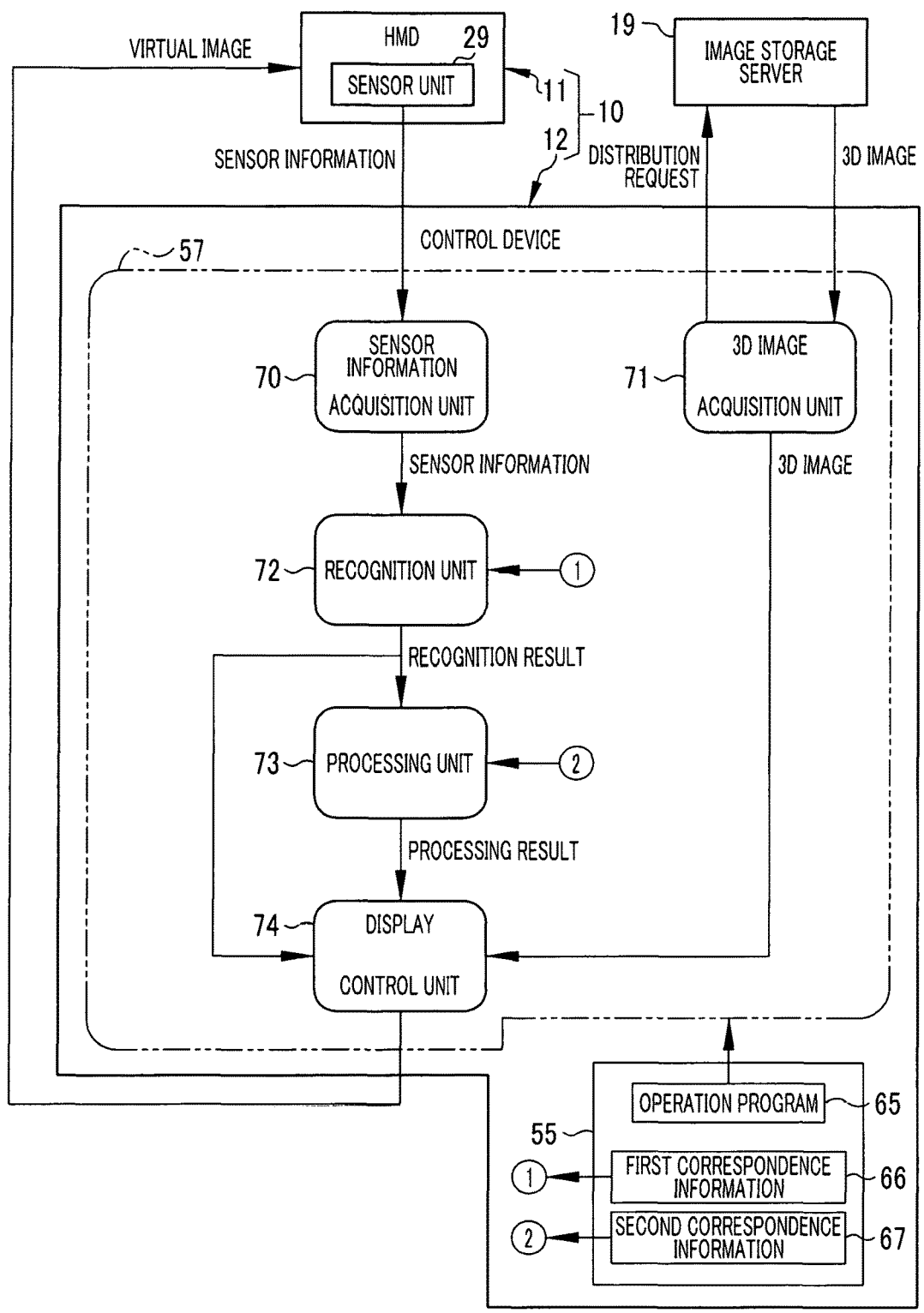
FIG. 8 is a block diagram illustrating functional units of a CPU in the control device.

In FIG. 8, the storage device 55 stores an operation program 65. The operation program 65 is an application program for causing a computer constituting the control device 12 to function as the control device of the HMD 11. The storage device 55 stores first correspondence information 66 (see FIGS. 10 to 15) and second correspondence information 67 (see FIGS. 16 and 17) in addition to the operation program 65.

If the operation program 65 is started, the CPU 57 cooperates with the memory 56 and the like to function as a sensor information acquisition unit 70, a 3D image acquisition unit 71, a recognition unit 72, a processing unit 73, and a display control unit 74.

The sensor information acquisition unit 70 acquires sensor information from the sensor unit 29 of the HMD 11. The sensor information includes a captured image of the space recognition camera, a captured image of the video camera, detection signals of the various sensors in the IMU, a captured image of the depth sensor, and sound recorded by the microphone. The sensor information acquisition unit 70 outputs the acquired sensor information to the recognition unit 72.

The 3D image acquisition unit 71 issues a distribution request of a 3D image 40 to the image storage server 19. The 3D image acquisition unit 71 acquires the 3D image 40 which has been transmitted from the image storage server 19 in response to the distribution request. The 3D image acquisition unit 71 outputs the acquired 3D image 40 to the display control unit 74.

The recognition unit 72 performs various recognitions based on the sensor information from the sensor information acquisition unit 70. The recognition unit 72 outputs a recognition result to the processing unit 73 and the display control unit 74. The processing unit 73 performs various types of processing based on the recognition result from the recognition unit 72. The processing unit 73 outputs a processing result to the display control unit 74. The display control unit 74 performs a display control function of controlling display of a virtual image including the 3D image 40 in the HMD 11.

Figure 9:
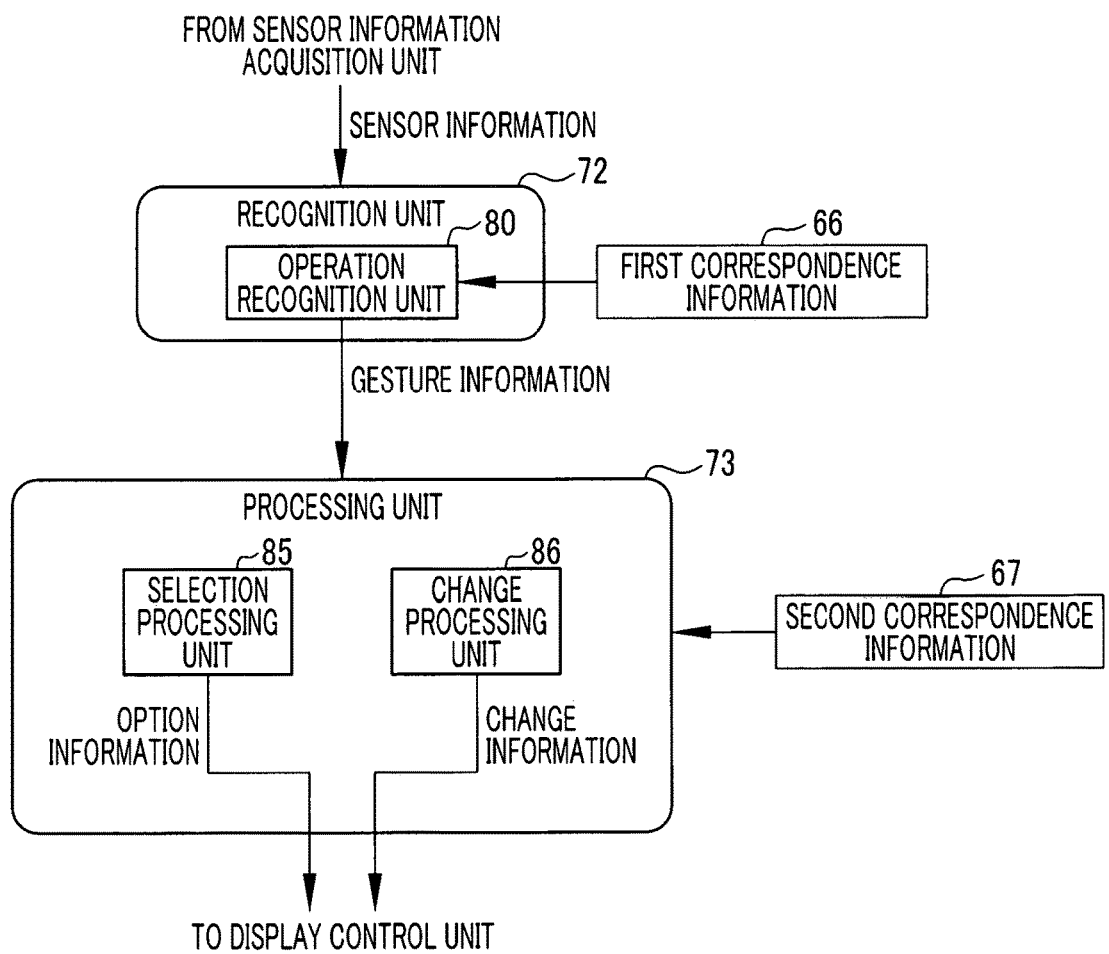
FIG. 9 is a block diagram illustrating details of a recognition unit and a processing unit.

In FIG. 9, the recognition unit 72 includes an operation recognition unit 80. The processing unit 73 includes a selection processing unit 85 and a change processing unit 86.

The captured image of the depth sensor in the sensor information from the sensor information acquisition unit 70 is input to the operation recognition unit 80. The operation recognition unit 80 performs an operation recognition function of recognizing a gesture operation based on the captured image of the depth sensor and the first correspondence information 66. The operation recognition unit 80 outputs information (hereinafter, gesture information) of the recognized gesture operation, as a recognition result, to the processing unit 73.

Various recognition units such as a sound recognition unit, a movement recognition unit, and a space recognition unit are provided in the recognition unit 72 in addition to the operation recognition unit 80. The sound recognition unit recognizes specific sound from the sound recorded by the microphone, in the sensor information. The specific sound is a voice uttered by the user 15, and a predetermined wording is registered. The movement recognition unit recognizes the movement of the head of the user 15 based on the captured image of the video camera and the detected signals of the various sensors in the IMU, in the sensor information. The space recognition unit performs space recognition of the surrounding environment when the image display system 10 is used, based on the captured image of the space recognition camera.

The processing unit 73 recognizes a gesture operation indicated by the gesture information from the operation recognition unit 80, based on the second correspondence information 67 in a form of various operation commands. Thus, the processing unit 73 performs various types of processing corresponding to the recognized operation commands. More specifically, the selection processing unit 85 of the processing unit 73 performs a selection processing function of cyclically switching one of the plurality of options relating to the 3D image 40, in accordance with a selection command (see FIGS. 16 and 17) among the operation commands. As illustrated in FIG. 6, the plurality of options includes the type of change processing, which refers to the display position, the display size, and the display orientation of the 3D image 40 in the adjust mode, and includes the plurality of structures as the target of change processing in the observe mode. The selection processing unit 85 outputs information (hereinafter, option information) of the selected one option, as the processing result, to the display control unit 74.

The change processing unit 86 performs a change processing function of performing change processing of changing the display form of the 3D image 40, which accompanies the one option selected by the selection processing unit 85, in accordance with a change command (see FIGS. 16 and 17) among the operation commands. Also as illustrated in FIG. 6, the change processing is change processing of each of the display position, the display size, and the display orientation of the 3D image 40 in the adjust mode, and is transmittance change processing of a structure in the observe mode. The change processing unit 86 outputs information (hereinafter, change information) indicating a result of the change processing, as the processing result, to the display control unit 74.

The processing unit 73 includes various processing unit in addition to the selection processing unit 85 and the change processing unit 86. For example, an image selection processing unit that issues a distribution request of the 3D image 40 to the 3D image acquisition unit 71 in accordance with an image selection command (see FIG. 16) among the operation commands or a mode switching processing unit that performs switching between the adjust mode and the observe mode in accordance with a mode switching command (see FIG. 17) among the operation command is provided. The processing unit 73 also recognizes an operation command for the specific sound recognized by the sound recognition unit, similar to the gesture information. The processing unit 73 performs various types of processing in accordance with the recognized operation command.

As illustrated in FIGS. 10 to 15, progression of the movement of the hand 37 of the user 15 and a gesture operation corresponding to the progress are registered in the first correspondence information 66. Firstly, a series of movements as follows is registered in first correspondence information 66A illustrated in FIG. 10. That is, fingertips of two fingers 38 (here, forefinger and thumb) are separate from each other (state of GA1), then, one finger 38 (here, forefinger) is lowered toward the thumb as illustrated with GA2. Then, as illustrated with GA3, one finger 38 is raised without losing time and thus the fingertips of the two fingers 38 are separated from each other again. Regarding this motion, a single tap operation is registered as the gesture operation.

A series of movements as follows is registered in first correspondence information 66B illustrated in FIG. 11. That is, movements of GB1 to GB3 are the same as GA1 to GA3 of the single tap operation in FIG. 10. However, after the fingertips of the two fingers 38 are separated from each other in GB3, one finger 38 (here, forefinger) is lowered toward the thumb again as illustrated with GB4, and then the one finger 38 is raised once more as illustrated with GB5. Thus, the fingertips of the two fingers 38 are separated from each other. In other words, this motion is a motion in which an operation of lowering at least one finger 38 other than the thumb toward the thumb and then raising the finger is consecutively performed twice. A double tap operation is registered, as the gesture operation, for this motion in the first correspondence information 66B.

In the single tap operation and the double tap operation, in a case where at least one finger 38 other than the thumb is lowered toward the thumb, it is not necessary that the fingertips of the thumb and the at least one finger 38 other than the thumb are brought into contact with each other.

Figure 10:
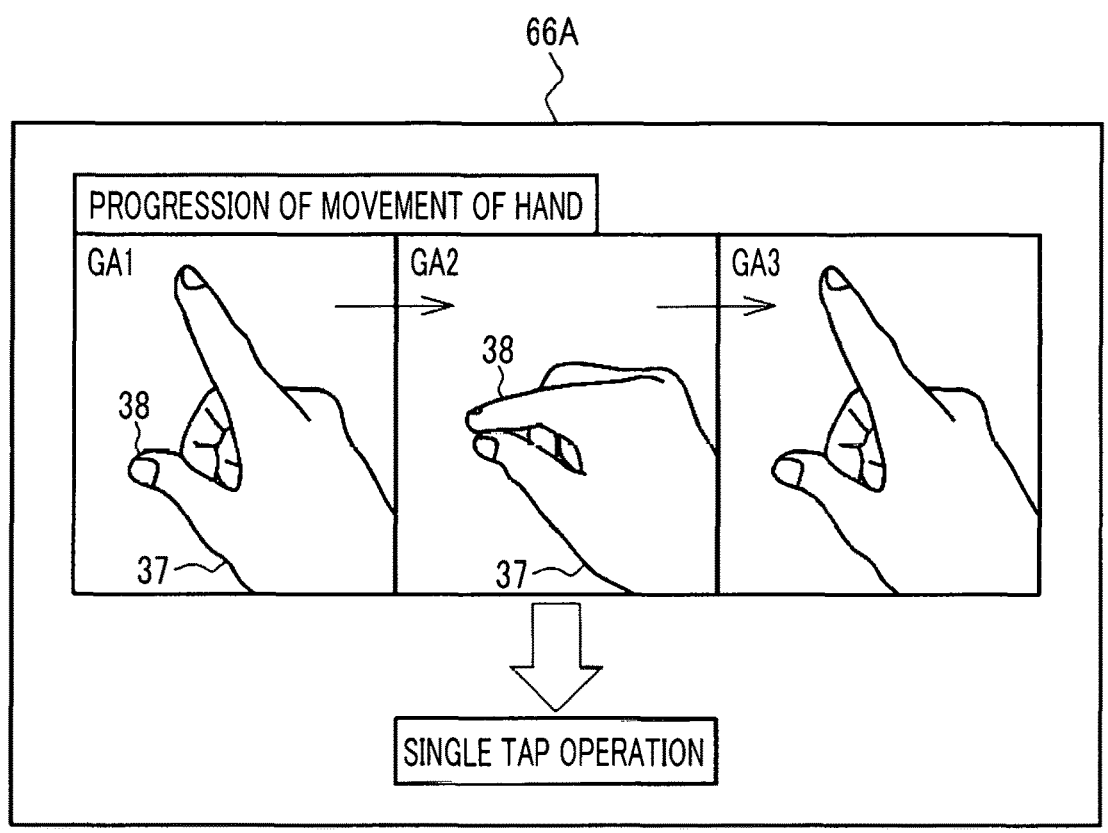
FIG. 10 is a diagram illustrating first correspondence information.
Figure 12:
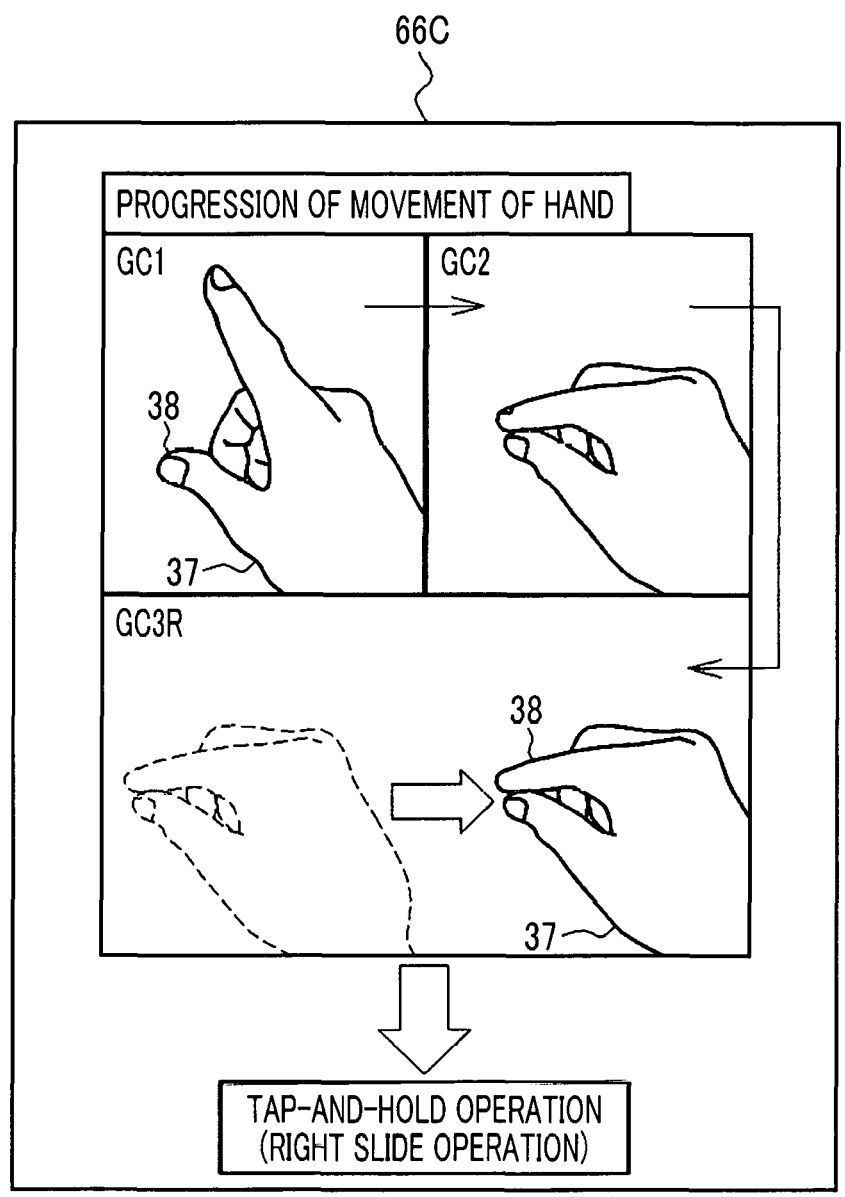
FIG. 12 is a diagram illustrating the first correspondence information.

Regarding movements in first correspondence information 66C illustrated in FIG. 12, movements of GC1 and GC2 are the same as GA1 and GA2 of the single tap operation in FIG. 10. In FIG. 10, the fingertips of the two fingers 38 are separated from each other in GA3 in FIG. 10. However, in FIG. 12, as illustrated with GC3R, the hand 37 is moved from the left to the right in a state where the fingertips of the two fingers 38 are in contact with each other. Regarding this motion, a right slide operation of a tap-and-hold operation is registered, as the gesture operation in the first correspondence information 66C.

Figure 13:
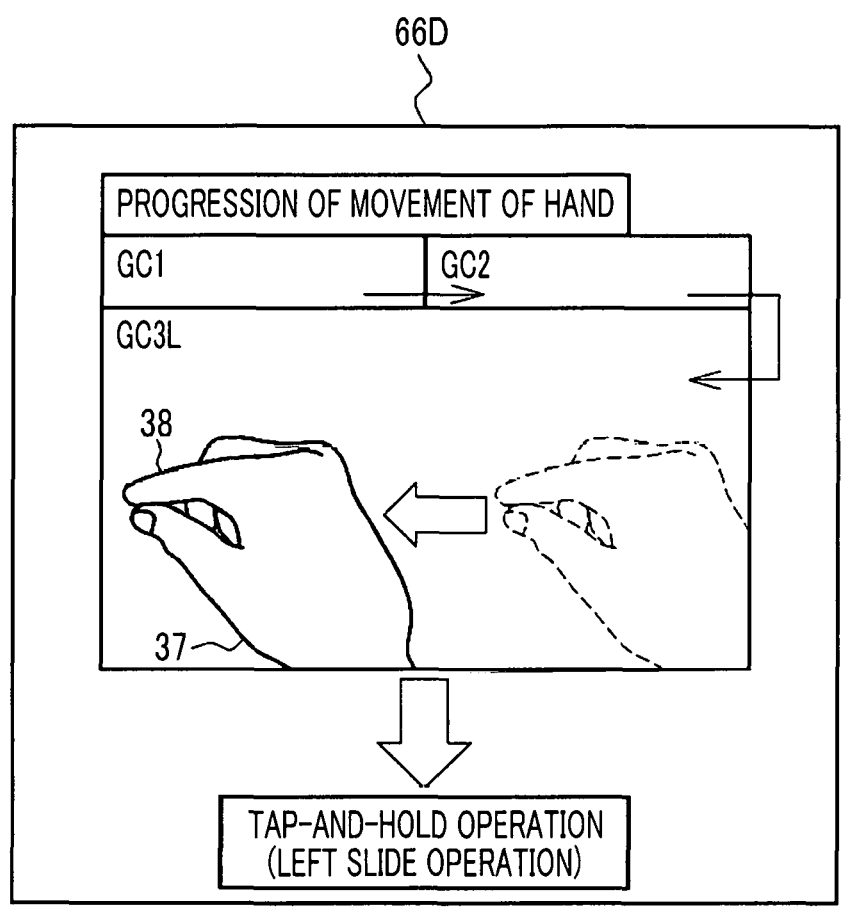
FIG. 13 is a diagram illustrating the first correspondence information.

Contrary to GC3R in FIG. 12, as illustrated with GC3L, a motion of moving the hand 37 from the right to the left in a state where the fingertips of the two fingers 38 are in contact with each other is registered in first correspondence information 66D illustrated in FIG. 13. Regarding this motion, a left slide operation of the tap-and-hold operation is registered as the gesture operation. Since the movements of GC1 and GC2 are the same as those in FIG. 12, illustrations will be omitted in FIG. 13. These are similarly applied to FIGS. 14 and 15.

Figure 14:
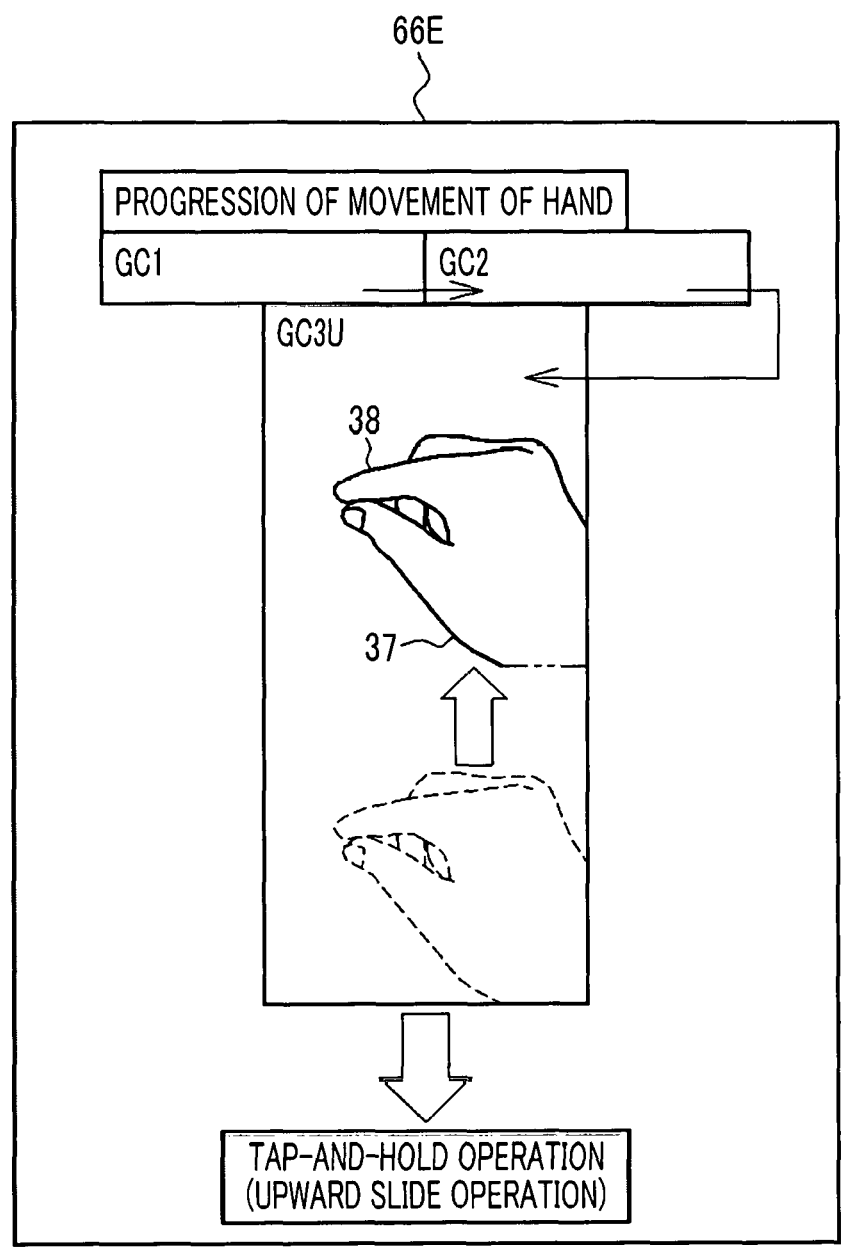
FIG. 14 is a diagram illustrating the first correspondence information.
Figure 15:
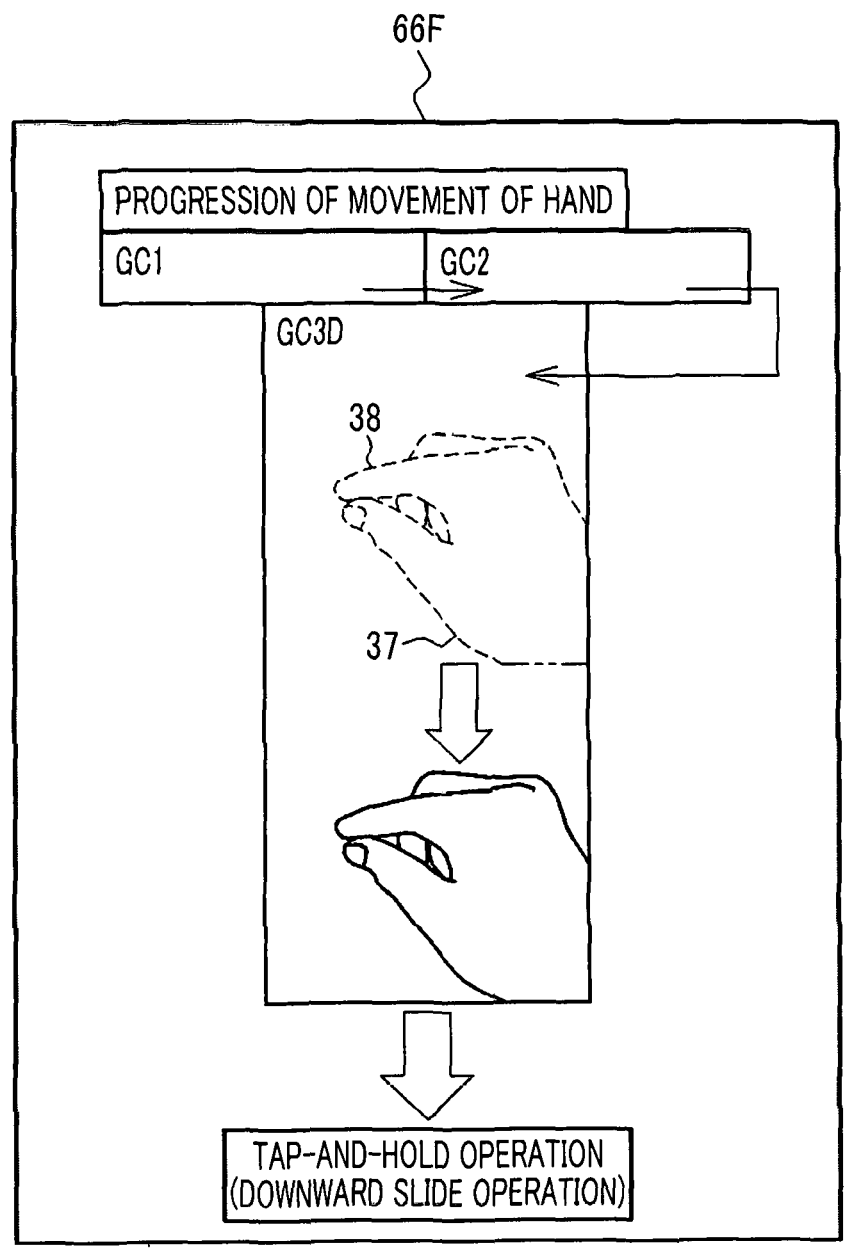
FIG. 15 is a diagram illustrating the first correspondence information.

As illustrated with GC3U, a motion of moving the hand 37 upwardly from the bottom in a state where the fingertips of the two fingers 38 are in contact with each other is registered in first correspondence information 66E illustrated in FIG. 14. Regarding this motion, an upward slide operation of the tap-and-hold operation is registered as the gesture operation. Contrary to GC3U in FIG. 14, as illustrated with GC3D, a motion of moving the hand 37 downwardly from the top in a state where the fingertips of the two fingers 38 are in contact with each other is registered in first correspondence information 66F illustrated in FIG. 15. Regarding this motion, a downward slide operation of the tap-and-hold operation is registered as the gesture operation.

Although not illustrated, a diagonal slide operation is also registered, as the tap-and-hold operation, in the first correspondence information 66 in addition to the right and left slide operations and the upward and downward slide operations illustrated in FIGS. 12 to 15. In the diagonal slide operation, the hand 37 is moved, for example, from the bottom left to the upper right, or is conversely moved, in a state where the fingertips of the two fingers 38 are in contact with each other. Alternatively, in the diagonal slide operation, the hand is moved from the bottom right to the upper left or is conversely moved in the above state.

Figure 11:
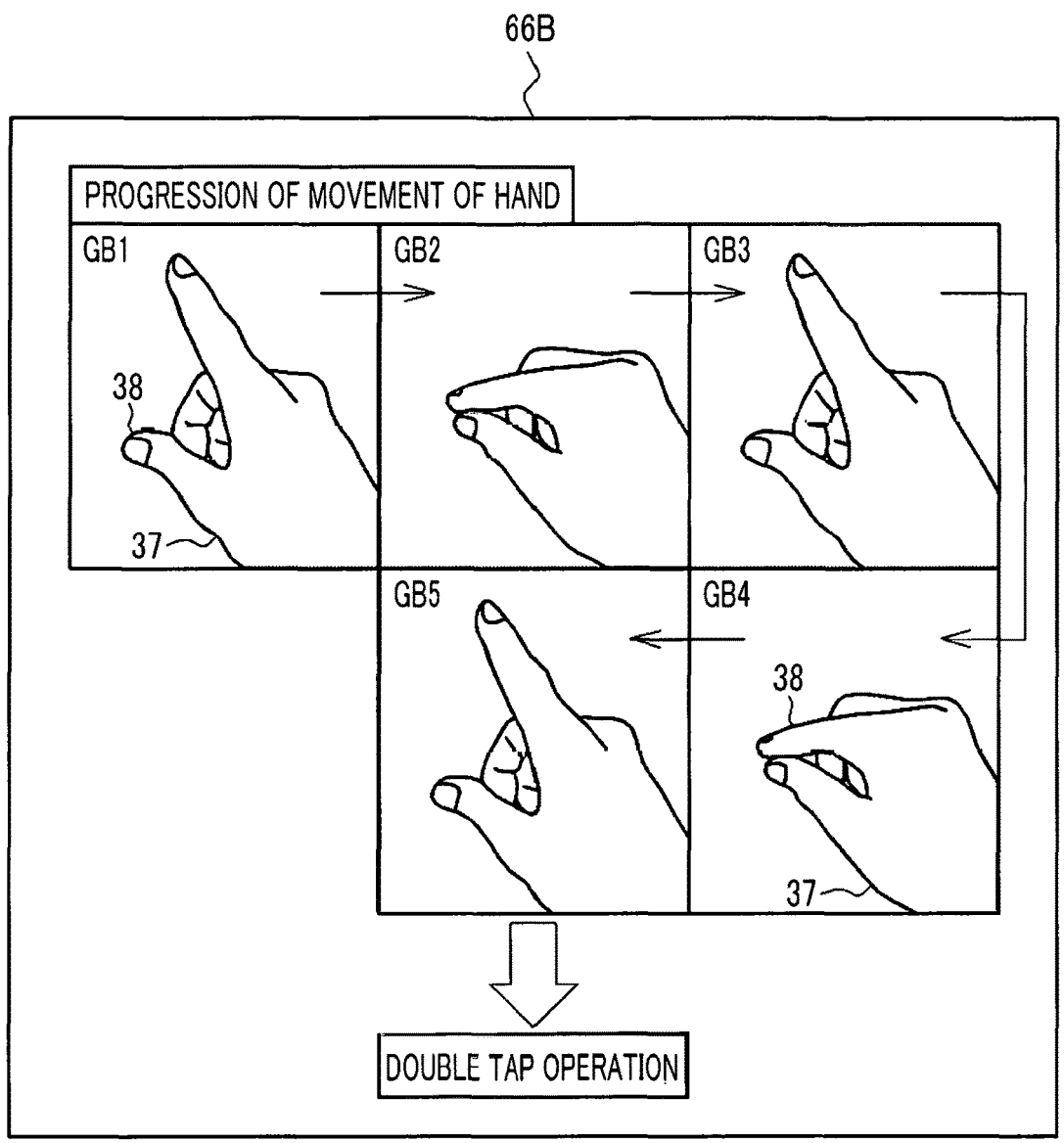
FIG. 11 is a diagram illustrating the first correspondence information.

The single tap operation illustrated in FIG. 10 and the double tap operation illustrated in FIG. 11 are gesture operations using the metacarpophalangeal joint which is the joint of the base of the finger 38, as a fulcrum. The tap-and-hold operation including the right and left slide operations and the upward and downward slide operations illustrated in FIGS. 12 to 15 or including the diagonal slide operation (not illustrated) are a gesture operation in which a slide operation of moving the hand 37 with any of a wrist, an elbow, or a shoulder as a fulcrum is added to a gesture operation with the metacarpophalangeal joint as a fulcrum.

The operation recognition unit 80 recognizes the fingertips of the two fingers 38 from the hand 37 of the user 15, which is displayed in the captured image of the depth sensor, by using the well-known image recognition technology. It is determined whether the moving trajectory of the recognized fingertip corresponds to any of progressions of the movements of the hand 37, which are registered in the first correspondence information 66.

For example, in a case where the fingertips of the two fingers 38 move to substantially the same position from a state of being separate from each other and then are separated from each other again, the operation recognition unit 80 determines to correspond to the motion registered in the first correspondence information 66A in FIG. 10, and recognizes the gesture operation to be a single tap operation. In a case where the fingertips of the two fingers 38 move to substantially the same position from a state of being separate from each other and then are separated from each other again, and then the positions of the fingertips of the two fingers 38 in this state move from the left to the right, the operation recognition unit 80 determines to correspond to the motion registered in the first correspondence information 66C in FIG. 12, and recognizes the gesture operation to be a right slide operation of a tap-and-hold operation. At least one finger 38 other than the thumb is not limited to the forefinger and may be the middle finger, the ring finger, or the little finger. The fingers may be the forefinger and the middle finger, for example.

As illustrated in FIGS. 16 and 17, a gesture operation and an operation command of each phase corresponding to the gesture operation are registered in the second correspondence information 67. Information of whether or not to perform viewpoint alignment is also registered in the second correspondence information 67.

Firstly, in a case where the phase is a selection of the 3D image 40 in Step ST100 in FIG. 6, an image selection command is assigned to a single tap operation performed with viewpoint alignment. The viewpoint alignment is used for selecting a desired 3D image 40 from a list of file icons of 3D images 40. That is, if the viewpoint position (cursor 41) is positioned at a desired 3D image 40 in the list of file icons of 3D images 40, and the single tap operation is performed in this state, a distribution request of the 3D image 40 positioned at the viewpoint position is transmitted from the 3D image acquisition unit 71 to the image storage server 19.

In a case where the phase is a setting of the initial display position of the 3D image 40 in Step ST110 in FIG. 6, a display-position setting command is assigned to a single tap operation performed with viewpoint alignment. The viewpoint alignment in this case is used for determining the initial display position of the 3D image 40. That is, if, after selection of the 3D image 40 is ended, the viewpoint position is aligned to a real object in the real space RS, and the single tap operation is performed in this state, the 3D image 40 is displayed on the real object to which the viewpoint position is aligned.

In the adjust mode in Step ST120 in FIG. 6, a selection command of cyclically switching selection of the type of change processing, which refers to the display position, the display size, and the display orientation of the 3D image 40 is assigned to a double tap operation. In the observe mode in Step ST130 in FIG. 6, a selection command of cyclically switching selection of the plurality of structures as a target of change processing is assigned to the double tap operation.

In a case where the display position is selected in the adjust mode (phase=adjust mode (display position)), a change command of moving the display position of the 3D image 40 to the right is assigned to a right slide operation of the tap-and-hold operation. A change command of moving the display position of the 3D image 40 to the left is assigned to a left slide operation of the tap-and-hold operation. Although not illustrated, a change command of moving the display position of the 3D image 40 upward or downward is assigned to an upward or downward slide operation of the tap-and-hold operation. A change command of moving the display position of the 3D image 40 diagonally forward or diagonally backward is assigned to a diagonal slide operation of the tap-and-hold operation.

In a case where the display size is selected in the adjust mode (phase=adjust mode (display size)), a change command of enlarging the display size of the 3D image 40 is assigned to a right slide operation of the tap-and-hold operation. A change command of reducing the display size of the 3D image 40 is assigned to a left slide operation of the tap-and-hold operation.

In a case where the display orientation is selected in the adjust mode (phase=adjust mode (display orientation)), a change command of rotating the 3D image 40 clockwise around a vertical axis is assigned to a right slide operation of the tap-and-hold operation and a change command of rotating the 3D image 40 counterclockwise around the vertical axis is assigned to a left slide operation of the tap-and-hold operation. A change command of rotating the 3D image 40 clockwise around a horizontal axis which is substantially parallel to a direction of the right and left slide operations of the tap-and-hold operation is assigned to an upward slide operation of the tap-and-hold operation. A change command of rotating the 3D image 40 counterclockwise around the horizontal axis is assigned to a downward slide operation of the tap-and-hold operation.

In the observe mode, a change command of increasing transmittance of the selected structure is assigned to the right slide operation of the tap-and-hold operation. A change command of decreasing the transmittance of the selected structure is assigned to the left slide operation of the tap-and-hold operation.

As an operation command which is commonly used in all phases, an end command of ending the operation program 65 is assigned to the single tap operation performed with viewpoint alignment. The viewpoint alignment in this case is used for selecting an end button 103 illustrated in FIGS. 24 and 25. In addition, a reset command and the like are registered in the second correspondence information 67. The reset command is assigned to a single tap operation performed with viewpoint alignment to a reset button 105 (see FIGS. 24 and 25) and is used for bringing the display of the 3D image 40 back to being in a state just after the initial display position has been set.

The viewpoint alignment is used, for example, in a case where the 3D image 40 is selected, in a case where the initial display position of the 3D image 40 is set, in a case where the end command is input, and in a case where the reset command is input. The selection command and the change command can be input only by the double tap operation or the tap-and-hold operation without the need of viewpoint alignment.

As illustrated in FIGS. 16 and 17, an operation command varies depending on the phase even though the same gesture operation is recognized. Therefore, the processing unit 73 normally understands the current phase, and recognizes a gesture operation indicated by gesture information from the operation recognition unit 80, as an operation command adapted to each phase.

In the example, a double tap operation is assigned to the selection operation which is a gesture operation of selecting one of a plurality of options, and a tap-and-hold operation is assigned to the change operation which is a gesture operation of performing change processing of changing the display form of a 3D image 40.

Figure 18:
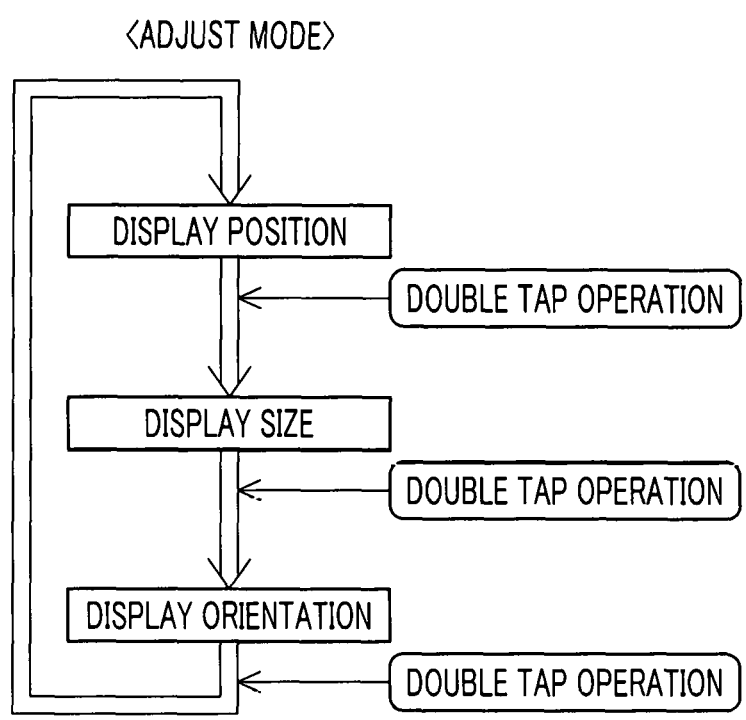
FIG. 18 is a diagram illustrating selection processing in an adjust mode.

In the adjust mode, as illustrated in FIG. 18, the selection processing unit 85 cyclically switches the type of change processing in an order of the display position, the display size, and the display orientation, every time the double tap operation is recognized. In a case where the double tap operation is recognized in a state where the last display orientation has been selected, the selection processing unit 85 brings the order back to the first display position and then performs selection. The first display position is selected at an initial stage performed in the adjust mode. The option information in this case corresponds to any of the display position, the display size, or the display orientation.

Figure 19:
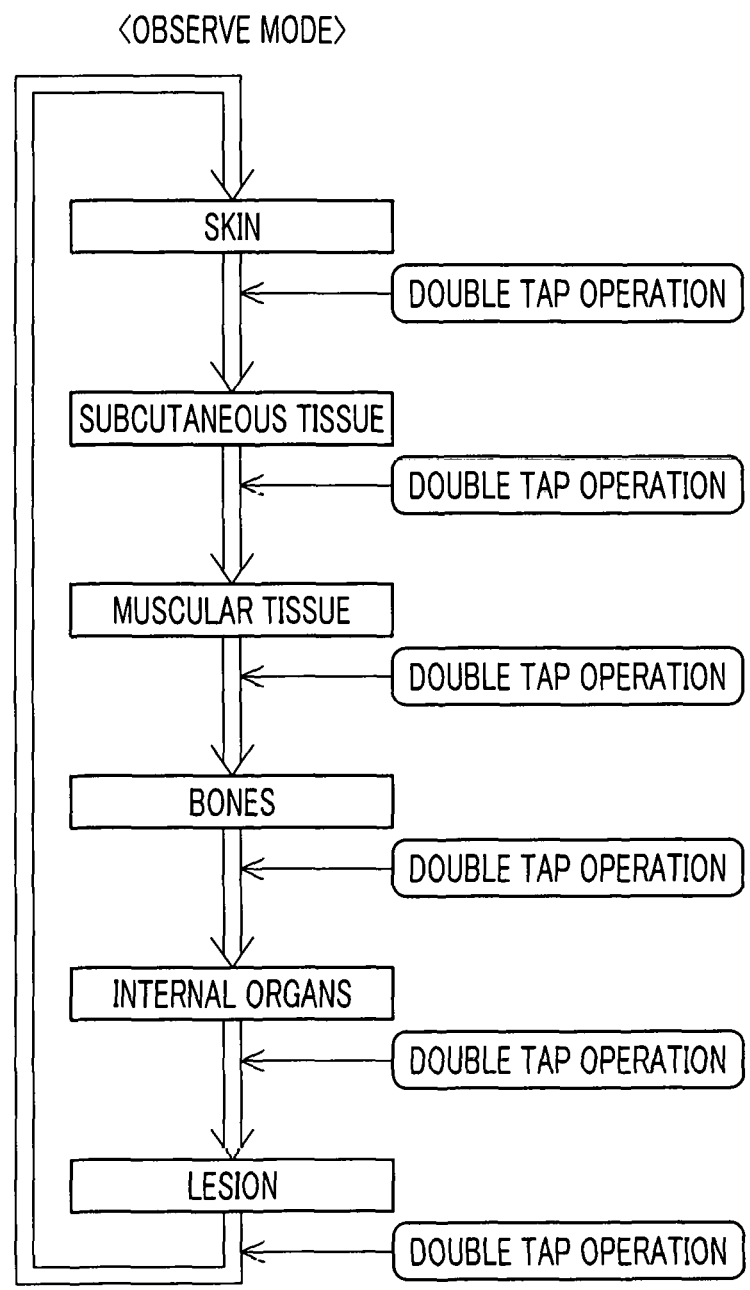
FIG. 19 is a diagram illustrating selection processing in an observe mode.

In the observe mode, as illustrated in FIG. 19, the selection processing unit 85 cyclically switches a structure as the target of change processing, in an order of the skin 46, the subcutaneous tissue 47, the muscular tissue 48, the bones 49, the internal organs 50, and the lesion 51, every time the double tap operation is recognized. In a case where plural types of the internal organs 50 such as the liver 50A and the stomach 50B are provided, each of the internal organs is handled as one option. Also in this case, similar to the case in FIG. 18, in a case where the double tap operation is recognized in a state where the last lesion 51 has been selected, the selection processing unit 85 brings the order back to the first skin 46 and then performs selection. The first skin 46 is selected at an initial stage performed in the observe mode. The option information in this case corresponds to any of the plurality of structures 46 to 51. The skin 46, the subcutaneous tissue 47, and the muscular tissue 48 may be collectively handled as one option, for example, as a body surface.

The name of each of the structures is also registered in advance, as specific sound recognized by the sound recognition unit. Therefore, in the observe mode, instead of switching is performed by the double tap operation, the user 15 can utter the name of a structure, so as to directly select the structure.

FIG. 20 is a diagram illustrating change processing of the display position of the 3D image 40 in the adjust mode (display position). The upper row of an arrow indicates a state where the user 15 brings fingertips of two fingers 38 of the hand 37 into contact with each other, shown in GC 2 of FIG. 13. As illustrated in the lower row of the arrow, in a case where the user 15 moves the hand 37 from the right to the left in this state, the operation recognition unit 80 recognizes the left slide operation of the tap-and-hold operation.

According to the second correspondence information 67 illustrated in FIG. 16, the change command of moving the display position of the 3D image 40 to the left is assigned to the left slide operation of the tap-and-hold operation in a case of the adjust mode (display position). Therefore, the change processing unit 86 performs change processing of moving the display position of the 3D image 40 to the left. The change information in this case indicates the amount of leftward displacement of the display position of the 3D image 40. The amount of displacement varies depending on a moving distance of the hand 37. As the moving distance of the hand 37 increases, the amount of displacement increases.

FIG. 21 is a diagram illustrating change processing of the display size of the 3D image 40 in the adjust mode (display size). Similar to the upper row of the arrow in FIG. 20, the upper row of an arrow indicates a state shown in GC 2 of FIG. 13. Similar to the lower row of the arrow in FIG. 20, the lower row of the arrow indicates a state where the user 15 moves the hand 37 from the right to the left. Also in this case, the operation recognition unit 80 recognizes the left slide operation of the tap-and-hold operation.

According to FIG. 16, since the change command of reducing the display size of the 3D image 40 is assigned to the left slide operation of the tap-and-hold operation in a case of the adjust mode (display size), the change processing unit 86 performs change processing of reducing the display size of the 3D image 40. The change information in this case indicates a reduction ratio of the display size of the 3D image 40. Similar to the amount of displacement in FIG. 20, the reduction ratio increases as the moving distance of the hand 37 increases.

FIG. 22 is a diagram illustrating change processing of the display orientation of the 3D image 40 in the adjust mode (display orientation). Also in this case, similar to the cases in FIGS. 20 and 21, a case where the operation recognition unit 80 recognizes the left slide operation of the tap-and-hold operation is exemplified.

According to FIG. 17, since the change command of rotating the display orientation of the 3D image 40 counterclockwise around the vertical axis is assigned to the left slide operation of the tap-and-hold operation in a case of the adjust mode (display orientation), the change processing unit 86 performs change processing of rotating the display orientation of the 3D image 40 counterclockwise around the vertical axis. The change information in this case indicates the amount of rotation of the 3D image 40. Similarly, as the moving distance of the hand 37 increases, the amount of rotation increases.

FIG. 23 is a diagram illustrating transmittance change processing of the 3D image 40 in the observe mode. In this case, unlike FIGS. 20 and 22, a case where the operation recognition unit 80 recognizes the right slide operation of the tap-and-hold operation. A case where the skin 46 is selected as the structure is exemplified.

According to FIG. 17, the change command of increasing transmittance of the selected structure is assigned to the right slide operation of the tap-and-hold operation in a case of the observe mode. Therefore, the change processing unit 86 performs transmittance change processing of increasing transmittance of the selected structure, that is, the skin 46 in this case, in the 3D image 40. The change information in this case indicates transmittance. The transmittance increases as the moving distance of the hand 37 increases.

In FIG. 23, as illustrated with hatching, an example of changing transmittance of a target region 87 which has been set in the 3D image 40 is exemplified. The target region 87 has a size as large as covering most of the abdomen and is set to have a square pillar shape along the depth direction. FIG. 23 illustrates a state where transmittance of the skin 46 increases and thus the subcutaneous tissue 47 which is a structure under the skin 46 is seen through, in the target region 87. The target region 87 may have a cylindrical shape or an elliptic cylinder shape. The entirety of the 3D image 40 may be set to be the target region 87.

The display control unit 74 edits the 3D image 40 from the 3D image acquisition unit 71, based on a space recognition result (for the surrounding environment when the image display system 10 is used) from the recognition unit 72 and a recognition result of the motion of the head of the user 15. More specifically, the display control unit 74 performs enlargement and reduction processing and rotation processing on the 3D image 40 such that the 3D image 40 has a size and an orientation in a case of being viewed from the position of the user 15, which is presented by the recognition result of the motion of the head. The enlargement and reduction processing and the rotation processing are performed individually from the change processing of the display size and the display orientation, which is performed by the change processing unit 86.

The display control unit 74 edits the 3D image 40 based on change information from the change processing unit 86. For example, in a case where the reduction ratio of the display size of the 3D image 40 is given as the change information from the change processing unit 86, as illustrated in the lower row of the arrow in FIG. 21, the display control unit 74 reduces the 3D image 40 at the given reduction ratio.

Figure 24:
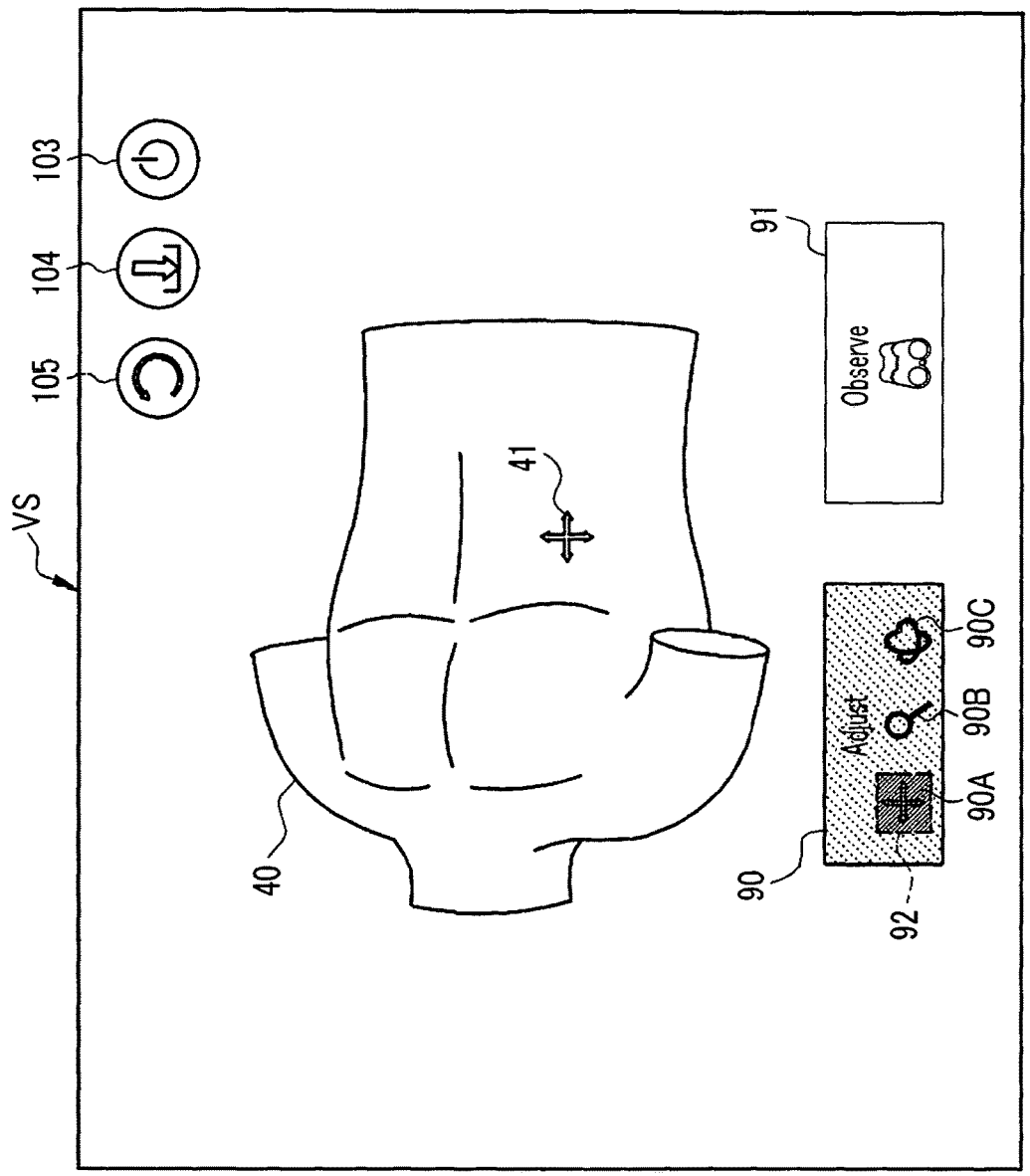
FIG. 24 is a diagram illustrating details of a virtual image in the adjust mode.
Figure 25:
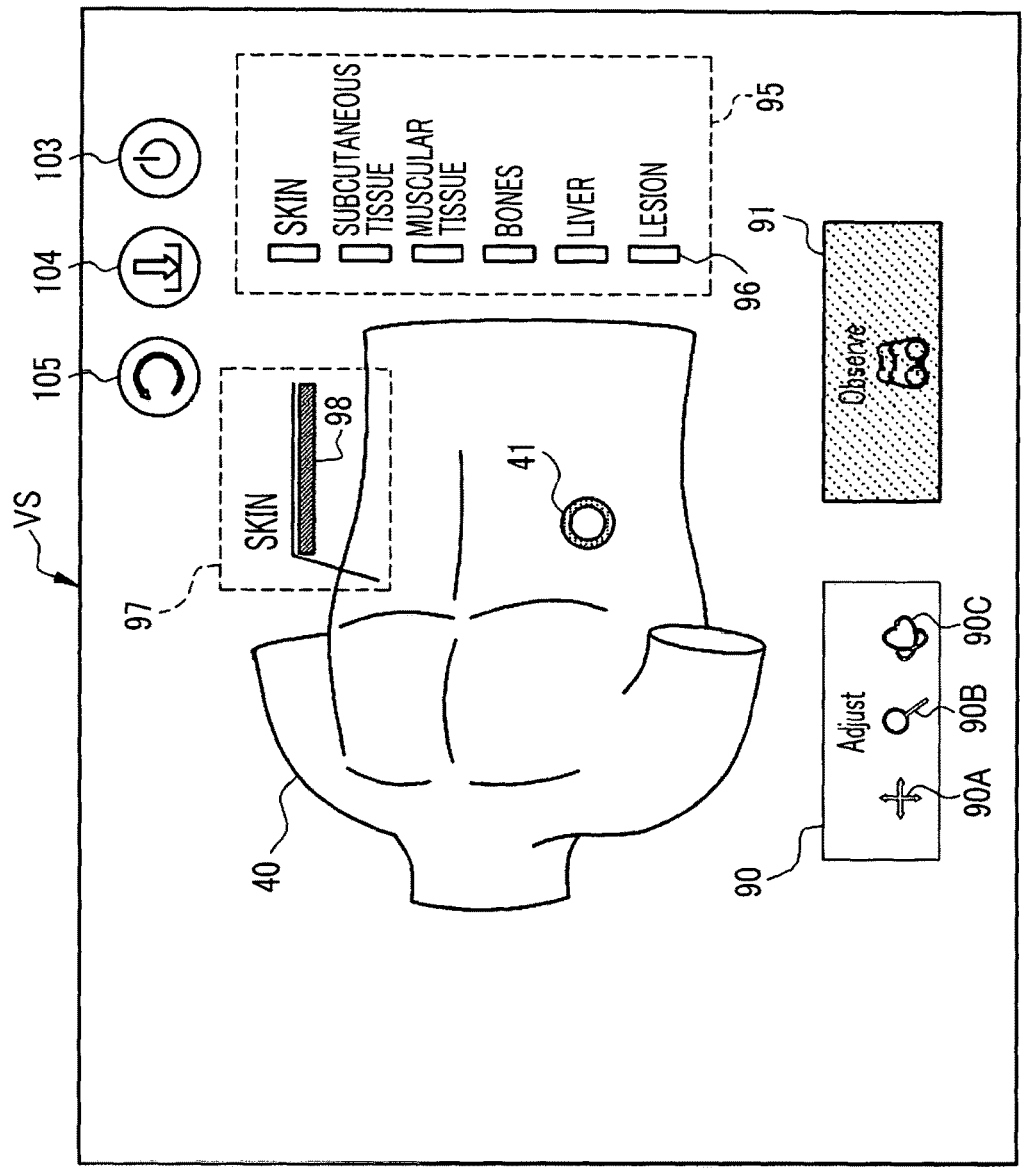
FIG. 25 is a diagram illustrating details of the virtual image in the observe mode.

FIGS. 24 and 25 illustrate details of a virtual image displayed in the virtual space VS. FIG. 24 illustrates a case of the adjust mode and FIG. 25 illustrates a case of the observe mode. The display control unit 74 displays an adjust-mode display bar 90 and an observe mode display bar 91 as a virtual image, in the virtual space VS in addition to the 3D image 40 and the cursor 41.

The display control unit 74 displays the display bars 90 and 91 at positions which are symmetrical to each other in the lower center of the virtual space VS. The display control unit 74 sets the display bars 90 and 91 to be translucent and thus allows the user 15 to visually recognize the 3D image 40 and real objects through the display bars 90 and 91.

Icons 90A, 90B, and 90C which respectively indicate the display position, the display size, and the display orientation as options in the adjust mode are arranged in the adjust-mode display bar 90 in order. That is, the adjust-mode display bar 90 corresponds to the menu bar in which a plurality of options is arranged in order. The icon 90A for the display position has a cross-like arrow shape. The icon 90B for the display size has a magnifying glass shape. The icon 90C for the display orientation has a shape in which two elliptical arrows perpendicularly intersect with each other.

In FIG. 24, in the adjust mode, the adjust-mode display bar 90 illustrated with hatching is focus-displayed in order to report a message indicating that the mode is the adjust mode, to the user 15. In contrast, in a case of the observe mode in FIG. 25, the observe mode display bar 91 is focus-displayed.

Focus display means that an option selected from the plurality of options is displayed to be distinguished from other options. For focus display, display techniques as follows are provided: a technique in which an option to be selected is displayed to have a color different from colors of other options (for example, an option to be selected is displayed to have a red color and other options are displayed to have a gray color (gray out)); a technique in which only an option to be selected is surrounded by a frame; or a technique in which an option to be selected is displayed to have an increased display size and to stand out. In FIGS. 24 and 25, the display bar of one mode in which selection is currently performed is displayed to have, for example, a dark blue color, and the display bar of the other mode is displayed to have, for example, a gray color.

In FIG. 24, the display control unit 74 focus-displays an icon for one option selected by the selection processing unit 85, among the icons 90A to 90C. FIG. 24 illustrates a form in which a display position is selected as one option by the selection processing unit 85 and the icon 90A for the display position is focus-displayed as indicated by hatching and a frame 92 of a broken line. In this case, the focus display is performed, for example, in a manner that an icon of the selected option is set to have a white color and other icons are set to have a gray color, or an icon of the selected option is surrounded by a red frame.

The display control unit 74 changes the cursor 41 to have the same shape as that of an icon of the selected option, in the adjust mode. In FIG. 24, since the display position is selected as one option by the selection processing unit 85, the cursor 41 is changed to have a cross-like arrow shape which is the same as that of the icon 90A for the display position.

In FIG. 25, in the observe mode, the display control unit 74 displays a structure list 95 on the right side of the virtual space VS. In the structure list 95, color bars 96 showing display colors in the virtual space VS and the names of the plurality of structures such as the skin 46 and the liver 50A are arranged in order. That is, similar to the adjust-mode display bar 90, the structure list 95 also corresponds to the menu bar in which the plurality of options is arranged in order.

The display control unit 74 focus-displays the name of one option selected by the selection processing unit 85 among the names of structures in the structure list 95. In this case, the focus display is performed, for example, in a manner that the name of one option selected by the selection processing unit 85 is set to be white and the names of others are set to be gray, and the display size of the name of the one option selected by the selection processing unit 85 is set to be larger than those of the names thereof. FIG. 25 illustrates a form in which the skin 46 is selected as one option by the selection processing unit 85 and the letters of "skin" are focus-displayed.

In the observe mode, the display control unit 74 displays an annotation 97 for the 3D image 40. The annotation 97 includes the name (here, "skin") of a structure which is currently selected, a line indicated by the position of the structure on the 3D image 40, and a transmittance display bar 98 indicating transmittance of the structure. The display control unit 74 fills the entirety of the transmittance display bar 98 with, for example, an aqua blue, in a case where transmittance is 0% (state where the structure can be completely visually recognized). In a case where the transmittance increases, the filled portion is reduced and the filled portion for transmittance of 100% is eliminated.

The display control unit 74 displays the end button 103, a read button 104, and the reset button 105 at the upper right portion of the virtual space VS. The end button 103 is a button for ending the operation program 65. If the viewpoint position (cursor 41) is positioned at the end button 103 and the single tap operation is performed, an end command is input to the processing unit 73 and the operation program 65 is ended.

The read button 104 is a button for displaying a list of file icons for 3D images 40 in the HMD 11, when a 3D image 40 to be displayed as a virtual object attempts to be selected. The reset button 105 is a button for bringing the display of the 3D image 40 back to the state just after the initial display position has been set.

Figure 26:
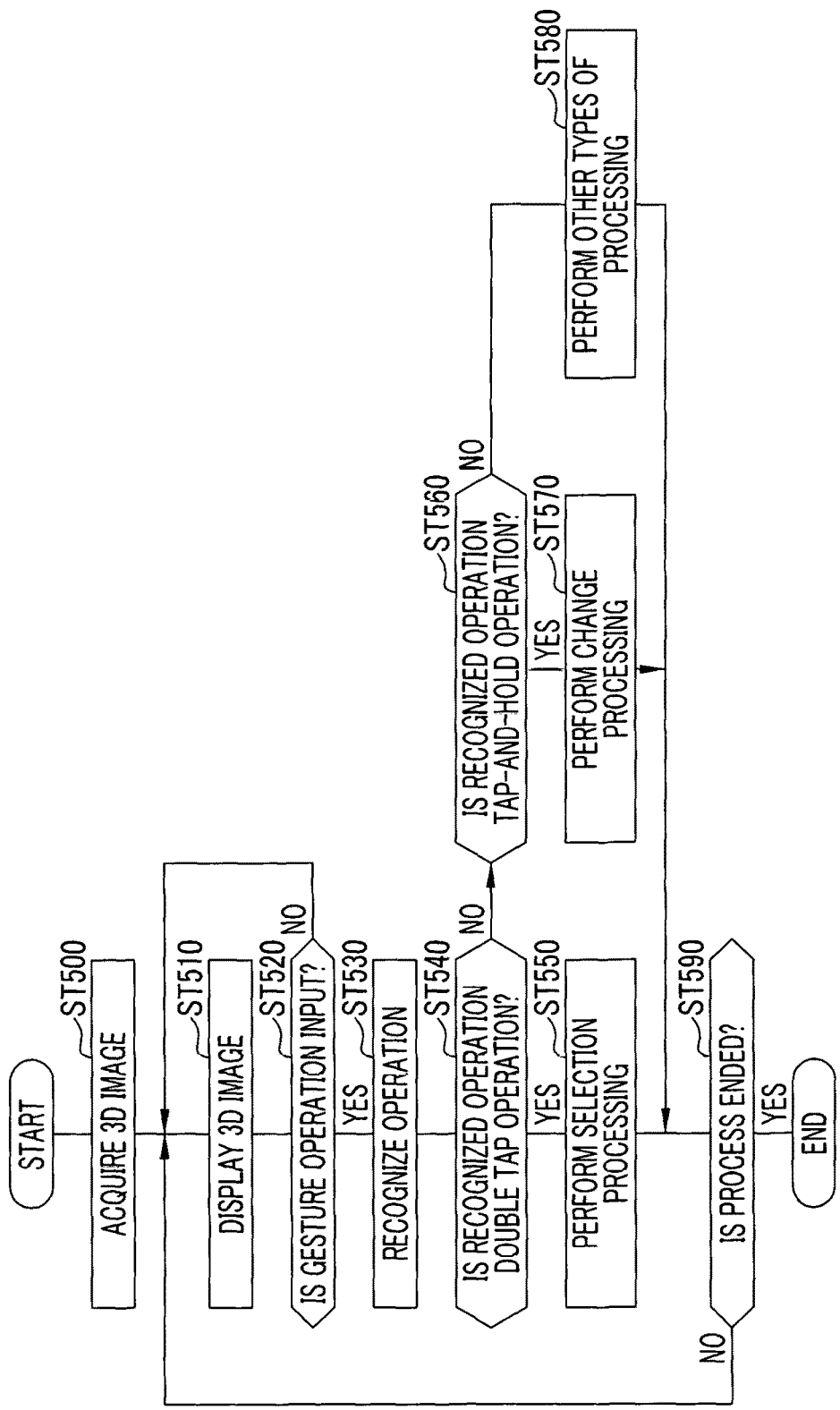
FIG. 26 is a flowchart illustrating a processing procedure of the control device.

An action with the above configuration will be described with reference to the flowchart in FIG. 26. Firstly, in the conference room 14, the user 15 mounts the image display system 10 on the head and then supplies power to the image display system 10. Thus, the operation program 65 is started on an operating system. Thus, the functional units such as the recognition unit 72, the processing unit 73, and the display control unit 74 are constructed in the CPU 57 of the control device 12, and the control device 12 functions as the control device of the HMD 11.

As indicated by Step ST100 in FIG. 6, a 3D image 40 of a target patient, which is displayed as a virtual object is selected. Thus, a distribution request of the 3D image 40 is transmitted from the 3D image acquisition unit 71 to the image storage server 19 and the 3D image 40 is distributed to the 3D image acquisition unit 71 from the image storage server 19.

In Step ST500, the 3D image 40 from the image storage server 19 is acquired by the 3D image acquisition unit 71. As indicated by Step ST110 in FIG. 6, the user 15 sets the initial display position of the 3D image 40. Thus, the 3D image 40 is displayed at the initial display position which has been set, under control of the display control unit 74 (Step ST510, display control step).

The user 15 approaches the 3D image 40 in order to understand details of, for example, the lesion 51 or goes far from the 3D image 40 in order to understand the whole image. Alternatively, the user 15 changes the orientation of the face or the standing position in order to observe the lesion 51 at a different angle. Display of the 3D image 40 by the display control unit 74 is updated with following such a motion of the user 15.

The user 15 performs various gesture operations on the 3D image 40 (YES in Step ST520). In the control device 12, the operation recognition unit 80 recognizes a gesture operation based on a captured image of the depth sensor (which has been acquired by the sensor information acquisition unit 70) and the first correspondence information 66 (Step ST530, operation recognition step).

In a case where the gesture operation recognized in Step ST530 is a double tap operation (YES in Step ST540), the selection processing unit 85 performs selection processing (Step ST550, selection processing step). Specifically, as illustrated in FIG. 18, in a case of being the adjust mode, one of the display position, the display size, or the display orientation as the type of change processing is selected. Every time the double tap operation is recognized, the type of change processing is cyclically switched in order of the display position, the display size, and the display orientation. As illustrated in FIG. 19, in a case of being the observe mode, one of a plurality of structures 46 to 51 as the target of change processing is selected. Every time the double tap operation is recognized, the target of change processing is cyclically switched in order of the plurality of structures 46 to 51.

In a case where the gesture operation recognized in Step ST530 is a tap-and-hold operation (NO in Step ST540 and YES in Step ST560), the change processing unit 86 performs change processing (Step ST570, change processing step). Specifically, as illustrated in FIGS. 20 to 22, in a case of being the adjust mode, change processing for any of the display position, the display size, or the display orientation of the 3D image 40 is performed. As illustrated in FIG. 23, in a case of being the observe mode, transmittance change processing for the selected structure is performed. In a case where the change processing for any of the display position, the display size, or the display orientation has been performed, any of the amount of displacement, the enlargement or reduction ratio, or the amount of rotation is output, as change information, from the change processing unit 86 to the display control unit 74. In a case where the transmittance change processing is performed, transmittance as the change information is output from the change processing unit 86 to the display control unit 74.

In a case where the gesture operation recognized in Step ST530 is not any of the double tap operation or the tap-and-hold operation (NO in Steps ST540 and ST560), that is, in a case where the gesture operation is a single tap operation, the processing unit 73 performs other kinds of processing (Step ST580). For example, in a case where the single tap operation is performed in the adjust mode, mode switching processing of changing to the observe mode is performed. In a case where the single tap operation with viewpoint alignment to the end button 103 is performed, ending processing of the operation program 65 is performed (YES in Step ST590). In a case where the ending processing of the operation program 65 has not been performed (NO in Step ST590), as necessary, the 3D image 40 is edited by the display control unit 74 and then the process returns to Step ST510.

Since the selection operation of selecting one of the plurality of options is set to be the double tap operation and the change operation for performing the change processing of changing the display form of the 3D image 40 is set to be the tap-and-hold operation, it is possible to clearly distinguish between the selection operation and the change operation and there is no concern that one of the selection operation and the change operation may be erroneously recognized as the other. Therefore, a situation in which processing which is not intended by a user is performed by erroneous recognition does not occur. Accordingly, it is possible to effectively prevent erroneous recognition of a gesture operation and to improve usability.

The display control unit 74 displays the adjust-mode display bar 90 in which the icons 90A to 90C for the display position, the display size, and the display orientation as options in the adjust mode are arranged in order, and the structure list 95 in which the names of the plurality of structures as options in the observe mode are arranged in order, in the virtual space VS. In addition, the display control unit 74 focus-displays the selected one option in the adjust-mode display bar 90 and the structure list 95. Thus, the user 15 can know an option selected by the user 15, at a glance. In particular, in a case where options are cyclically switched only by the double tap operation without the viewpoint alignment, the user 15 tends to lose the sight of an option which is currently selected. However, according to such focus display, an occurrence of a situation in which the sight of an option in the process of being selected is lost is reliably prevented.

As the type of change processing, three types, that is, the display position, the display size, and the display orientation of the 3D image 40 are provided. Therefore, even though the type of change processing is set to be an option and options are set to be cyclically switched, the options make a lap with just three double tap operations. Thus, stress of the gesture operation on the user 15 when a desired option is selected is relatively low.

On the contrary, the number of plurality of structures as the target of change processing is relatively large. Thus, stress of the gesture operation when a desired option is selected is applied to the user 15 more than that in a case of the type of the change processing. Therefore, in the first embodiment, a structure can be also selected by the user 15 uttering the name of the structure.

Here, in order to relieve the stress of the gesture operation on the user 15, a method of selecting a structure by the selection operation with viewpoint alignment instead of cyclically switching structures by the double tap operation is also considered. Specifically, the selection operation of a structure with viewpoint alignment means a method of performing any gesture operation in a state where the cursor 41 is positioned at a desired structure. However, in a case where such a method of selecting a structure by the selection operation with viewpoint alignment is employed, it is difficult to position the viewpoint position (cursor 41) at a place, for example, the internal organs 50 (which is not capable of being visually recognized so long as transmittance is not changed) or the lesion 51 (which is a small portion of the internal organs 50). Thus, stress is applied more to the user 15 in a case where viewpoint alignment is performed. Accordingly, it is possible to effectively relieve stress on the user 15 by setting the plurality of structures as the target of change processing to be options and cyclically switching the options by the double tap operation.

The change operation is an operation of increasing or decreasing the numerical values, for example, the display position, the display size, and the display orientation or the amount of displacement, the enlargement or reduction ratio, the amount of rotation, and the transmittance. Therefore, the slide operation of enabling the user 15 to image the increase or decrease of the numerical value by, for example, moving right and left or moving up and down, as in the tap-and-hold operation, is suitable as the change operation instead of the gesture operation of hitting the finger 38, such as the single tap operation or the double tap operation.

Here, as illustrated in FIG. 12, the motions of the hand 37 in GC1 and GC2 of the tap-and-hold operation are the same as the motions of the hand 37 in GA1 and GA2 of the single tap operation illustrated in FIG. 10. Therefore, in a case where the user 15 moves the hand 37 as in GC1 and GC2 in order to perform the tap-and-hold operation and then stops the tap-and-hold operation due to change of the mind, the motion of the hand 37 is exactly the same as the single tap operation illustrated in FIG. 10. Thus, in this case, the operation recognition unit 80 may perform erroneous recognition as the single tap operation.

Therefore, in a case where not the double tap operation and but the single tap operation is employed as the selection operation, the tap-and-hold operation as the change operation may be erroneously recognized as the single tap operation as the selection operation. Thus, not the single tap operation and but the double tap operation is employed as the selection operation. Accordingly, even in a case where the tap-and-hold operation which is suitable as the change operation although being erroneously recognized as the single tap operation is employed, it is possible to effectively prevent erroneous recognition between the selection operation and the change operation.

The slide operation is not limited to the tap-and-hold operation. For example, an operation in which the hand 37 is moved with any of a wrist, an elbow, or a shoulder as a fulcrum in a state where the fingertip of one finger 38 such as the forefinger is put upright may be provided as the slide operation.

Second Embodiment

In the first embodiment, regardless of whether or not the double tap operation is provided, the adjust-mode display bar 90 and the structure list 95 are displayed as the menu bar, in the virtual space VS. However, in a second embodiment illustrated in FIG. 27, the menu bar is displayed only in a case where the double tap operation is recognized.

Figure 27:
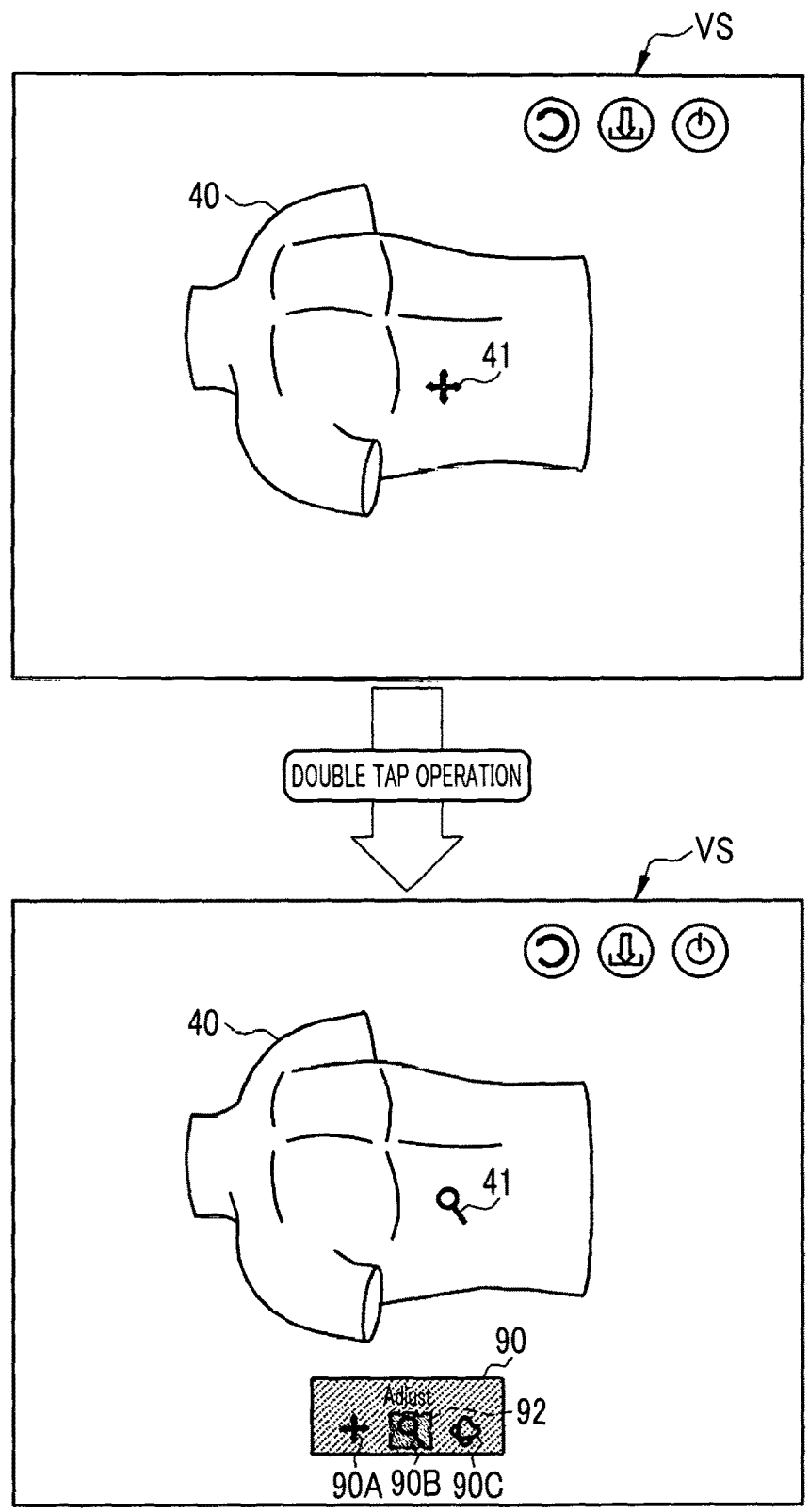
FIG. 27 is a diagram illustrating a second embodiment in which an adjust-mode display bar is displayed only in a case where a double tap operation is recognized.

FIG. 27 illustrates an example of the adjust-mode display bar 90. The upper row of an arrow indicates a state where the display position among the types of change processing is selected. In this state, the display control unit 74 does not display the adjust-mode display bar 90 in the virtual space VS. In a case where the double tap operation is performed by the user 15 in order to switch the type of change processing from the display position to the display size, from the state in the upper row of the arrow, and the double tap operation is recognized by the operation recognition unit 80, the display control unit 74 displays the adjust-mode display bar 90 in the virtual space VS, as illustrated in the lower row of the arrow. Then, the adjust-mode display bar 90 is erased after a predetermined time, for example, 5 seconds elapses.

As described above, since the adjust-mode display bar 90 is displayed only in a case where the double tap operation is recognized, it is possible to largely reduce a time during which the field of vision of the user 15 is restricted by the adjust-mode display bar 90. In FIG. 27, the adjust-mode display bar 90 is illustrated. Similarly, the structure list 95 may be displayed only in a case where the double tap operation is recognized.

Third Embodiment

In a third embodiment illustrated in FIG. 28, the menu bar is displayed only in a case where the double tap operation is recognized, and the menu bar is displayed at the viewpoint position of the user 15.

FIG. 28 illustrates an example of the adjust-mode display bar 90, similar to the case of FIG. 27. The upper row of an arrow indicates a state where the display position among the types of change processing is selected. In a case where the double tap operation is performed by the user 15 from this state and the double tap operation is recognized by the operation recognition unit 80, the display control unit 74 displays the adjust-mode display bar 90 at the viewpoint position of the user 15, that is, the position of the cursor 41 in the virtual space VS, as in the lower row of the arrow. Then, the adjust-mode display bar 90 is erased after a predetermined time, for example, 5 seconds elapses.

As described above, since the adjust-mode display bar 90 is displayed at the viewpoint position of the user 15, moving of the viewpoint of the user 15 when an option in the process of being selected is confirmed is performed in the minimum. In the examination of a surgical policy of the target patient, it is considered that the viewpoint of the user 15 concentrates on the 3D image 40. Therefore, if moving of the viewpoint of the user 15 when the option in the process of being selected is confirmed is performed in the minimum, the user 15 can examine the surgical policy of the target patient without diverting the viewpoint from the 3D image 40. Also in this case, similar to the second embodiment, the structure list 95 may also be displayed at the viewpoint position of the user 15.

As the change processing on a structure, instead of or in addition to the transmittance change processing in the first embodiment, processing of changing the display color, brightness, or sharpness of the selected structure may be provided.

The change processing may be performed on all other structure except for the selected structure, without performing the change processing on the selected structure. For example, in a case where the selected structure is the liver 50A, transmittance of the skin 46, the subcutaneous tissue 47, the muscular tissue 48, and the bones 49 as other structures except for the liver 50A and other internal organs 50 is collectively changed. This is suitable because the transmittance of other structures is changed to 100% at once in a case where visual recognition of only the selected structure is desired. The user 15 may select whether the change processing is performed on the selected structure or whether the change processing is performed on other structures except for the selected structure.

The gesture-operation recognition unit such as the depth sensor may not be mounted in the image display system 10. The gesture-operation recognition unit may be installed at any position so long as the unit can capture an image of at least the hand 37 of the user 15. Therefore, the gesture-operation recognition unit may not capture an image of the field of vision which is the same as the augmented reality space ARS recognized by the user 15. For example, the gesture-operation recognition unit may be installed on the wall or the ceiling of the conference room 14 so as to capture the hand 37 of the user 15.

Figure 29:
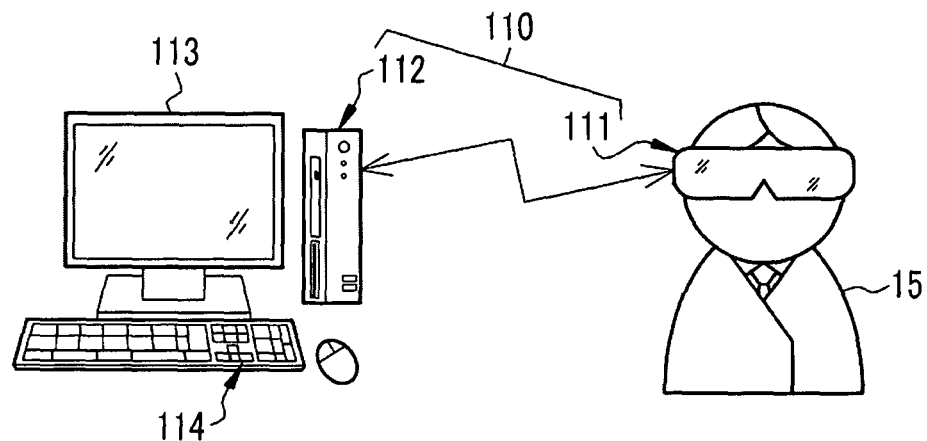
FIG. 29 is a diagram illustrating another example of the image display system.

In the above embodiments, the image display system 10 in which the HMD 11 and the control device 12 are integrated with each other is exemplified. However, the present invention is not limited to the above image display system. As illustrated in FIG. 29, an image display system 110 in which an HMD 111 and a control device 112 are separately provided may be provided. In FIG. 29, a desktop type personal computer including a display 113 and an input device 114 (configured by a keyboard and a mouse) is illustrated as the control device 112. However, a notebook type personal computer or a tablet computer may be provided.

Figure 30:
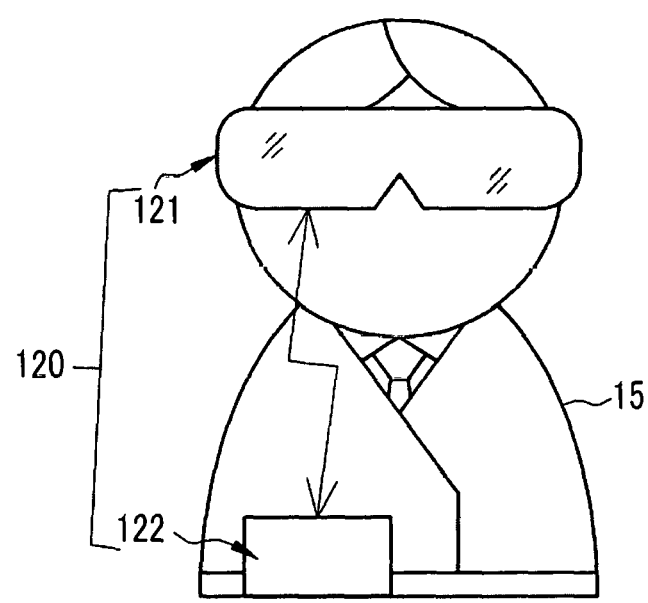
FIG. 30 is a diagram illustrating still another example of the image display system.

Alternatively, as illustrated in FIG. 30, an image display system 120 in which a portable computer 122 which can be carried by being worn on the waist or the like by the user 15 is caused to perform the functions of the control device of an HMD 121 may be provided. In this case, the portable computer may be a product dedicated for the image display system 120 or the commercial personal computer.

The image storage server 19 may perform all or some of the functions of the control device of the HMD. For example, the image storage server 19 may perform the function of the display control unit 74. Alternatively, a server separated from the image storage server 19 may perform the function of the control device of the HMD. A network server installed in an external facility which is not the computer room 18 in the medical facility 13 may perform the function of the control device of the HMD. The image storage server 19 may be installed in an external facility, as the network server.

As described above, a hardware configuration of the computer constituting the control device of the HMD in the present invention can variously modified. In order to improve processing capacity and reliability, the control device of the HMD can be configured by a plurality of computers which are separated in an aspect of hardware. For example, the functions of the sensor information acquisition unit 70 and the 3D image acquisition unit 71, the functions of the recognition unit 72 and the processing unit 73, and the function of the display control unit 74 are distributed to three computers. In this case, the three computers constitute the control device of the HMD.

As described above, the hardware configuration of the computer can be appropriately changed in accordance with the required performance such as processing capacity, safety, and reliability. The above descriptions are not limited to hardware. In order to secure safety or reliability, an application program such as the operation program 65 can be duplicated or can be distributed to and stored in a plurality of storage devices.

The image display system or the HMD is not limited to the type in which the entirety of both eyes of the user 15 is covered by the protective frame 27 and the mounting portion 26 is fixed to the head of the user 15, as in the above embodiments. A glass type image display system including a temple worn to the ear of the user 15, a nose pad abutting on the lower portion of the eye-lid, a rim supporting the screen, and the like may be used.

The HMD is not limited to a tool for causing the user 15 to recognize the augmented reality space ARS obtained by combining the real space RS and the virtual space VS. A tool of causing the user 15 to recognize only the virtual space VS may be provided.

The 3D image 40 is not limited to an image of the upper body of the target patient on the supine posture. The 3D image 40 may be an image of the whole body on the supine posture or an image of another part such as the head. The structure may include vascular tissues such as the portal vein and inferior vena cava or nerve tissues such as spinal cord, in addition to the skin 46, the subcutaneous tissue 47, and the like exemplified in the above embodiments.

In the above embodiments, examination of a surgical policy of a target patient, which is performed in the medical facility 13 is exemplified as the user of the image display system and a 3D image 40 is exemplified as a virtual object. However, the user of the image display system is not limited to the examination of a surgical policy of a target patient and the virtual object is also not limited to the 3D image 40. For example, the image display system may be used for a game and a character in the game may be set as a virtual object.

In the above embodiments, for example, hardware configurations of the processing units that performs various types of processing, such as the sensor information acquisition unit 70, the 3D image acquisition unit 71, the recognition unit 72, the processing unit 73, the display control unit 74, the operation recognition unit 80, the selection processing unit 85, and the change processing unit 86 correspond to various processors as follows.

The various processors include a CPU, a programmable logic device (PLD), a dedicated electric circuit, and the like. As is well known, the CPU is a general-purpose processor that executes software (program) and functions as various processing units. The PLD is a processor such as a field programmable gate array (FPGA), of which a circuit configuration can be changed after being manufactured. The dedicated electric circuit is a processor such as an application specific integrated circuit (ASIC), which has a circuit configuration designed to be dedicated for performing specific processing.

One processing unit may be configured by one of the various processors or by combination of two processors or more of the same type or the different types (for example, combination of a plurality of FPGAs or combination of a CPU and an FPGA). A plurality of processing units may be configured by one processor. As an example in which the plurality of processing units is configured by one processor, forms as follows are provided. Firstly, there is a form in which one processor is configured by combination of one or more CPUs and software and the processor functions as the plurality of processing units. Secondly, as represented by a system-on-chip (SoC), there is a form of using a processor in which functions of the entirety of a system including the plurality of processing units is realized by one IC chip. As described above, the various processing units are configured by using one or more of the various processors, as a hardware configuration.

The hardware structures of the various processors are, more specifically, electric circuits (circuitry) in which circuit elements such as semiconductor elements are combined, It is possible to understand a control device of a head mounted display described in Appendix 1 as follows.

APPENDIX 1

A control device of a head mounted display, that controls an operation of the head mounted display which is mounted on the head of a user and allows the user to recognize a virtual space, the device comprising:

a display control processor that displays a three-dimensional virtual object in the virtual space, an operation recognition processor that recognizes a gesture operation performed on the virtual object with a hand of the user, a selection processing processor that selects one of a plurality of options relating to the virtual object in a case where a double tap operation in which an operation of lowering at least one finger other than a thumb toward the thumb and then raising the finger is consecutively performed twice is recognized as the gesture operation, and that cyclically switches the option to be selected every time the double tap operation is recognized, and a change processing processor that performs change processing of changing a display form of the virtual object, which accompanies one option selected by the selection processing processor in a case where a slide operation of moving the hand with any of a wrist, an elbow, or a shoulder as a fulcrum is recognized as the gesture operation.

The present invention is not limited to the above embodiments and may employ various configurations in a range without departing from the gist of the present invention. The above-described embodiments or various modification examples may be appropriately combined. The present invention relates to a storage medium storing a program, in addition to the program.

EXPLANATION OF REFERENCES 10, 110, 120: image display system
11, 111, 121: head mounted display (HMD)
12, 112: control device
122: portable computer
13: medical facility
14: conference room
15: user
17: network
18: computer room
19: image storage server
25: main body portion
26: mounting portion
27: protective frame
28: screen
29: sensor unit
30: control unit
31: nose pad
32: inner ring
33: outer ring
34: speaker
36: table
37: hand
38: finger
40: three-dimensional volume rendering image (3D image)
41: cursor
45: CT scan image
46: skin
47: subcutaneous tissue
48: muscular tissue
49: bones
50: internal organs
50A: liver
50B: stomach
50C: spleen
51: lesion
55: storage device
56: memory
57: CPU
58: data bus 65: operation program
66, 66A to 66F: first correspondence information
67: second correspondence information
70: sensor information acquisition unit
71: 3D image acquisition unit
72: recognition unit
73: processing unit
74: display control unit
80: operation recognition unit
85: selection processing unit
86: change processing unit
87: target region
90: adjust-mode display bar (menu bar)
90A to 90C: icon
91: observe mode display bar
92: frame
95: structure list (menu bar)
96: color bar
97: annotation
98: transmittance display bar
103: end button
104: read button
105: reset button
ARS: augmented reality space
RS: real space
VS: virtual space
ST100 to ST130, ST500 to ST590 step

What is claimed is:

1. A control device of a head mounted display, that controls an operation of the head mounted display which is mounted on a head of a user and allows the user to recognize a virtual space, the control device comprising:
a display control unit that displays a three-dimensional virtual object in the virtual space;
an operation recognition unit that recognizes a gesture operation performed on the virtual object with a hand of the user;
a selection processing unit that selects one of a plurality of options relating to a display form of the virtual object or a type of the virtual object in a case where a double tap operation in which an operation of lowering at least one finger other than a thumb toward the thumb and then raising the finger is consecutively performed twice is recognized as the gesture operation; and
a change processing unit that performs change processing of changing the display form of the virtual object displayed in the virtual space or the type of the virtual object displayed in the virtual space, based on the one option selected in the selection processing unit in a case where a slide operation of moving the hand with any of a wrist, an elbow, or a shoulder as a fulcrum is recognized as the gesture operation,
wherein the options include a display position, a display size, and a display orientation of the virtual object, as a type of the change processing.

2. The control device of the head mounted display according to claim 1,
wherein the display control unit displays a menu bar in which the plurality of options is arranged in order, in the virtual space, and
the one option selected by the selection processing unit is focus-displayed in the menu bar.

3. The control device of the head mounted display according to claim 2,
wherein the display control unit displays the menu bar only in a case where the double tap operation is recognized as the gesture operation.

4. The control device of the head mounted display according to claim 3,
wherein the display control unit displays the menu bar at a viewpoint position of the user.

5. The control device of the head mounted display according to claim 4,
wherein the virtual object has a plurality of structures, and the options include the plurality of structures as a target of the change processing.

6. The control device of the head mounted display according to claim 3,
wherein the virtual object has a plurality of structures, and the options include the plurality of structures as a target of the change processing.

7. The control device of the head mounted display according to claim 2,
wherein the virtual object has a plurality of structures, and the options include the plurality of structures as a target of the change processing.

8. The control device of the head mounted display according to claim 1,
wherein the virtual object has a plurality of structures, and the options include the plurality of structures as a target of the change processing.

9. The control device of the head mounted display according to claim 8,
wherein the change processing unit performs transmittance change processing of changing transmittance of one structure selected by the selection processing unit among the plurality of structures, as the change processing.

10. The control device of the head mounted display according to claim 1,
wherein the virtual object is a three-dimensional volume rendering image of a human body.

11. The control device of the head mounted display according to claim 1,
wherein the slide operation is a tap-and-hold operation of moving the hand in a state where fingertips of two fingers are brought into contact with each other.

12. An operation method of the control device of the head mounted display according to claim 1, that controls an operation of the head mounted display which is mounted on the head of the user and allows the user to recognize the virtual space, the method comprising:
a display control step of displaying the three-dimensional virtual object in the virtual space;
an operation recognition step of recognizing the gesture operation performed on the virtual object with the hand of the user;
a selection processing step of selecting one of the plurality of options relating to a display form of the virtual object or a type of the virtual object in a case where the double tap operation in which the operation of lowering at least one finger other than the thumb toward the thumb and then raising the finger is consecutively performed twice is recognized as the gesture operation, and of cyclically switching the option to be selected every time the double tap operation is recognized; and
a change processing step of performing the change processing of changing the display form of the virtual object displayed in the virtual space or the type of the virtual object displayed in the virtual space, based on the one option selected in the selection processing step in a case where the slide operation of moving the hand with any of the wrist, the elbow, or the shoulder as the fulcrum is recognized as the gesture operation, wherein the options include a display position, a display size, and a display orientation of the virtual object, as a type of the change processing.

13. A non-transitory computer readable recording medium storing an operation program causing a computer to function as the control device of the head mounted display according to claim 1, that controls an operation of the head mounted display which is mounted on a head of the user and allows the user to recognize the virtual space, the program causing a computer to perform:
   a display control function of displaying the three-dimensional virtual object in the virtual space;
   an operation recognition function of recognizing the gesture operation performed on the virtual object with the hand of the user;
   a selection processing function of selecting one of the plurality of options relating to a display form of the virtual object or a type of the virtual object in a case where the double tap operation in which the operation of lowering at least one finger other than the thumb toward the thumb and then raising the finger is consecutively performed twice is recognized as the gesture operation; and
   a change processing function of performing the change processing of changing the display form of the virtual object displayed in the virtual space or the type of the virtual object displayed in the virtual space, based on the one option selected by the selection processing function in a case where the slide operation of moving the hand with any of the wrist, the elbow, or the shoulder as the fulcrum is recognized as the gesture operation,
   wherein the options include a display position, a display size, and a display orientation of the virtual object, as a type of the change processing.

14. The control device of the head mounted display according to claim 1,
   wherein the selection processing unit cyclically switches the option to be selected every time the double tap operation is recognized.

15. An image display system which includes a head mounted display mounted on a head of a user and a control device that controls an operation of the head mounted display and allows the user to recognize a virtual space through the head mounted display, the system comprising:
   a display control unit that displays a three-dimensional virtual object in the virtual space;
   an operation recognition unit that recognizes a gesture operation performed on the virtual object with a hand of the user;
   a selection processing unit that selects one of a plurality of options relating to a display form of the virtual object or a type of the virtual object in a case where a double tap operation in which an operation of lowering at least one finger other than a thumb toward the thumb and then raising the finger is consecutively performed twice is recognized as the gesture operation; and
   a change processing unit that performs change processing of changing the display form of the virtual object displayed in the virtual space or the type of the virtual object displayed in the virtual space, based on the one option selected in the selection processing unit in a case where a slide operation of moving the hand with any of a wrist, an elbow, or a shoulder as a fulcrum is recognized as the gesture operation,
   wherein the options include a display position, a display size, and a display orientation of the virtual object, as a type of the change processing.

16. The control device of the head mounted display according to claim 15,
   wherein the selection processing unit cyclically switches the option to be selected every time the double tap operation is recognized.

17. A control device of a head mounted display, that controls an operation of the head mounted display which is mounted on the head of a user and allows the user to recognize a virtual space, the control device comprising:
   a processor configured to:
   display a three-dimensional virtual object in the virtual space,
   recognize a gesture operation performed on the virtual object with a hand of the user,
   select one of a plurality of options relating to a display form of the virtual object or a type of the virtual object in a case where a double tap operation in which an operation of lowering at least one finger other than a thumb toward the thumb and then raising the finger is consecutively performed twice is recognized as the gesture operation, and
   perform change processing of changing the display form of the virtual object displayed in the virtual space or the type of the virtual object displayed in the virtual space, based on one option selected by the selection processing processor in a case where a slide operation of moving the hand with any of a wrist, an elbow, or a shoulder as a fulcrum is recognized as the gesture operation,
   wherein the options include a display position, a display size, and a display orientation of the virtual object, as a type of the change processing.

18. The control device of the head mounted display according to claim 17,
   wherein the processor is configured to cyclically switch the option to be selected every time the double tap operation is recognized.

19. A control device of a head mounted display, that controls an operation of the head mounted display which is mounted on a head of a user and allows the user to recognize a virtual space, the control device comprising:
   a display control unit that displays a three-dimensional virtual object in the virtual space;
   an operation recognition unit that recognizes a gesture operation performed on the virtual object with a hand of the user;
   a selection processing unit that selects one of a plurality of options relating to a display form of the virtual object or a type of the virtual object in a case where a double tap operation in which an operation of lowering at least one finger other than a thumb toward the thumb and then raising the finger is consecutively performed twice is recognized as the gesture operation; and
   a change processing unit that performs change processing of changing the display form of the virtual object displayed in the virtual space or the type of the virtual object displayed in the virtual space, based on the one option selected in the selection processing unit, in a case where a slide operation of moving the hand with any of a wrist, an elbow, or a shoulder as a fulcrum is recognized as the gesture operation,
   wherein the virtual object is a plurality of structures of human tissue, and wherein the selection processing unit cyclically switches one of the plurality of structures of human tissue which is a target of the change processing.

\* \* \* \* \*